US012792312B2

(12) United States Patent
Dakshinamurthy et al.

(10) Patent No.: US 12,792,312 B2
(45) Date of Patent: Nov. 10, 2026

(54) METADATA DRIVEN PLATFORM FOR CUSTOMIZED APPLICATION DEVELOPMENT

(71) Applicant: ADP, Inc., Roseland, NJ (US)

(72) Inventors: Krishnan Dakshinamurthy, Hyderabad (IN); Prashant Kumar, Hyderabad (IN); Amit Bhavsar, Hyderabad (IN); Mohit Gupta, Uttar Pradesh (IN)

(73) Assignee: ADP, Inc., Roseland, NJ (US)

( * ) Notice: Subject to any disclaimer, the term of this patent is extended or adjusted under 35 U.S.C. 154(b) by 282 days.

(21) Appl. No.: 18/475,800

(22) Filed: Sep. 27, 2023

(65) Prior Publication Data

US 2025/0103301 A1 Mar. 27, 2025

(51) Int. Cl.

| | |
|---|---|
| ***G06F 9/44*** | (2018.01) |
| ***G06F 8/30*** | (2018.01) |
| ***G06F 8/35*** | (2018.01) |
| ***G06F 9/445*** | (2018.01) |
| ***G06F 9/45*** | (2006.01) |
| ***G06F 9/455*** | (2018.01) |
| ***G06F 40/18*** | (2020.01) |

(52) U.S. Cl.

CPC .................. *G06F 8/30* (2013.01); *G06F 8/35* (2013.01); *G06F 40/18* (2020.01)

(58) Field of Classification Search

CPC ..... G06F 8/30; G06F 8/36; G06F 8/35; G06F 40/18

See application file for complete search history.

(56) References Cited

U.S. PATENT DOCUMENTS 11,556,702 B2 * 1/2023 Logan ................. G06F 16/2379
11,720,350 B1 * 8/2023 Bogushefsky, III ...... G06F 8/76 717/108

(Continued)

FOREIGN PATENT DOCUMENTS

CA 3084152 A1 6/2019
CN 115951871 A * 4/2023
JP 7153725 B2 * 10/2022 ............... G06F 8/38

OTHER PUBLICATIONS

Soumen Chakraborty, Why You Need a Metadata-driven Data Integration Framework, 2023, pp. 1-10. https://www.freshgravity.com/insights-blogs/metadata-driven-data-integration-framework/ (Year: 2023).*

(Continued)

*Primary Examiner* — Mongbao Nguyen
(74) *Attorney, Agent, or Firm* — Foley & Lardner LLP

(57) ABSTRACT

Automated generating of customized applications using ledger metadata templates with user-defined elements for the customized application is described. The solution can identify a ledger comprising a plurality of parameters for a plurality of elements of an application and construct a plurality of metadata corresponding to the plurality of elements using the plurality of parameters. The solution can adjust, based on a validation rule for an element, a metadata corresponding to the element. The solution can select a plurality of functions corresponding to the plurality of elements and generate, using the plurality of functions, a version of the application configured based at least on the plurality of metadata comprising the adjusted metadata.

20 Claims, 13 Drawing Sheets

(56) References Cited

U.S. PATENT DOCUMENTS

| | | | | |
|---|---|---|---|---|
| 11,960,864 | B2 * | 4/2024 | Kaliyaperumal | G06V 30/413 |
| 12,307,244 | B2 * | 5/2025 | Velasco | G06F 8/38 |
| 2014/0109037 | A1 | 4/2014 | Ouali | |
| 2016/0092179 | A1 | 3/2016 | Straub | |
| 2020/0026711 | A1 * | 1/2020 | Blom | G06F 16/254 |
| 2020/0371755 | A1 | 11/2020 | Patni et al. | |
| 2021/0133202 | A1 * | 5/2021 | Fry | G06F 11/3006 |
| 2021/0397418 | A1 | 12/2021 | Nikumb et al. | |
| 2022/0012426 | A1 * | 1/2022 | Ziemer | G06F 16/245 |
| 2022/0350447 | A1 * | 11/2022 | Sreenivasachar | G06F 16/211 |
| 2022/0413843 | A1 * | 12/2022 | Agarwal | G06F 8/34 |
| 2023/0071263 | A1 * | 3/2023 | Hatcher | G06Q 20/102 |
| 2023/0252233 | A1 * | 8/2023 | Gutierrez | G06F 40/40 704/9 |
| 2023/0393832 | A1 * | 12/2023 | Touati | H04L 67/10 |
| 2025/0094142 | A1 * | 3/2025 | Chang | G06F 9/541 |

OTHER PUBLICATIONS

Michael Grabatin, Reliability and Scalability Improvements to Identity Federations by managing SAML Metadata with Distributed Ledger Technology, 2018, pp. 1-6. https://ieeexplore.ieee.org/stamp/stamp.jsp?tp=&arnumber=8406310 (Year: 2018).*

Soumen Chakraborty, Why You Need a Metadata-driven Data Integration Framework, 2023, pp. 1-14. https://www.freshgravity.com/insights-blogs/metadata-driven-data-integration-framework/ (Year: 2023).*

English translation, Wang (CN 11595187 A), 2023, pp. 1-14. (Year: 2023).*

English translation, JP (JP 7153725 B2), 2022, pp. 1-58. (Year: 2022).*

International Search Report and Written Opinion issued in corresponding International Application No. PCT/US2024/048679, dated Jan. 3, 2025 (19 pages).

International Preliminary Report on Patentability on PCT App. No. PCT/US2024/048679 dated Apr. 9, 2026 (11 pages).

* cited by examiner

500

700

900

1100

METADATA DRIVEN PLATFORM FOR CUSTOMIZED APPLICATION DEVELOPMENT

TECHNICAL FIELD

The present disclosure relates generally computing technology, and particularly to development of applications including without limitation, systems and methods for customized application development.

BACKGROUND

Due to the increasingly varying types of heterogenous data processed by an application, it can be technically challenging to develop an application that can process the data in a reliable and efficient manner to generate an accurate output without introducing excessive delays or latencies in the pipeline.

SUMMARY

The technical solutions described herein facilitate efficient and streamlined production of applications (i.e., computer program products, e.g., web-based, mobile, etc.) that are customizable based on metadata from users in the form of templates, without having the users write any source code. The metadata templates may allow the users to specify elements of the application to be produced. Designing customized applications can be challenging, time consuming and expensive. This can be particularly emphasized when objectives to be addressed by the applications vary over time, further driving the demand for additional updates and customization which takes time and resources. Such resources can include users who can program, i.e., write source code for the application to be customized. The technical solutions described herein overcome such technical challenges by allowing users to streamline generation of customized applications using parameters and fields in a ledger. In some aspects, the ledger may be a spreadsheet, a worksheet, a text file, or any other digital representation. Examples described herein are described using "spreadsheet" as the type of input from the user; however, it is understood that the user may provide the input in any other form. For example, the spreadsheets can include user-modified parameters for customizing specific application elements, such as user interface prompts, menu selections, selection buttons, validation features and more. The solutions described herein allow a user to input the spreadsheet with user configured elements into a metadata creator to produce a formatted metadata, which can be used by an application creator to generate the customized application having the user-specified elements.

An aspect of solutions can relate to a system. The system can include one or more processors coupled with memory. The one or more processors can identify a spreadsheet comprising a plurality of parameters for a plurality of elements of a user interface to control an application. The one or more processors can construct, via a metadata conversion protocol, a plurality of metadata corresponding to the plurality of elements using the plurality of parameters. The one or more processors can adjust, based on a validation rule applied to an element of the plurality of elements, a metadata of the plurality of metadata corresponding to the element. The one or more processors can select, based at least one the plurality of elements, a plurality of functions for the plurality of metadata. The one or more processors can generate, using the plurality of functions, a version of the application configured with the user interface comprising the plurality of elements based at least on the plurality of metadata comprising the adjusted metadata.

An aspect of the solutions can relate to a method. The method can include one or more processors coupled with memory identifying a spreadsheet comprising a plurality of parameters for a plurality of elements of a user interface to control an application. The method can include the one or more processors constructing, via a metadata conversion protocol, a plurality of metadata corresponding to the plurality of elements using the plurality of parameters. The method can include the one or more processors adjusting, based on a validation rule applied to an element of the plurality of elements, a metadata of the plurality of metadata corresponding to the element. The method can include the one or more processors selecting, based at least one the plurality of elements, a plurality of functions for the plurality of metadata. The method can include the one or more processors generating, using the plurality of functions, a version of the application configured with the user interface comprising the plurality of elements based at least on the plurality of metadata comprising the adjusted metadata.

An aspect of the solutions can relate to a non-transitory computer-readable medium storing instructions that, when executed by at least one processor of a service, cause the at least one processor to identify a spreadsheet comprising a plurality of parameters for a plurality of elements of a user interface to control an application. The instructions, when executed, can cause the at least one processor to construct, via a metadata conversion protocol, a plurality of metadata corresponding to the plurality of elements using the plurality of parameters. The instructions, when executed, can cause the at least one processor to adjust, based on a validation rule applied to an element of the plurality of elements, a metadata of the plurality of metadata corresponding to the element. The instructions, when executed, can cause the at least one processor to select, based at least one the plurality of elements, a plurality of functions for the plurality of metadata. The instructions, when executed, can cause the at least one processor to generate, using the plurality of functions, a version of the application configured with the user interface comprising the plurality of elements based at least on the plurality of metadata comprising the adjusted metadata.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION OF ASPECTS OF THE INVENTION

Figure 1:
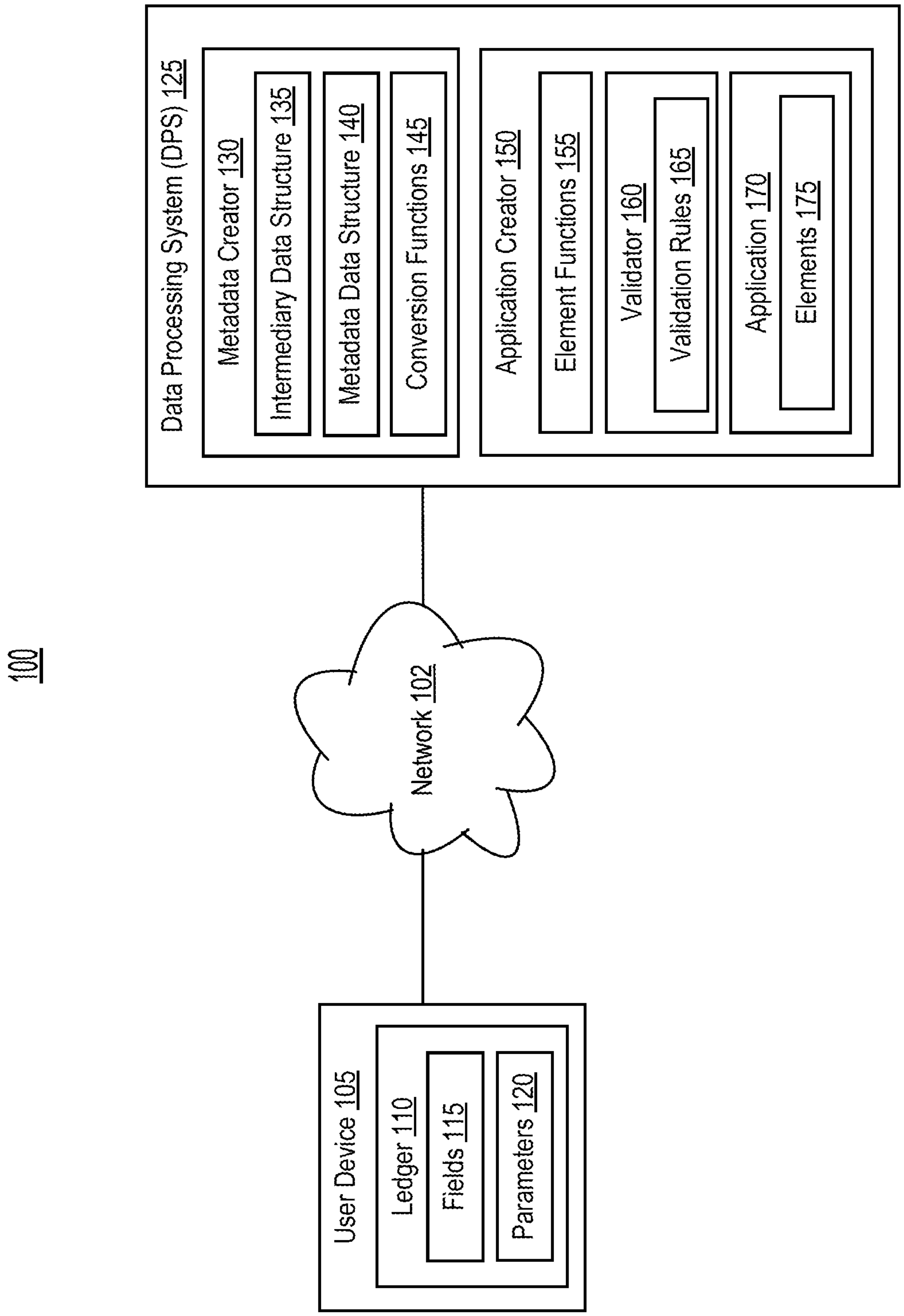
FIG. 1 is an illustrative example of a system to instantiate versions of applications using ledger templates with user-defined configurations of application elements according to one or more aspects.

The technical solutions described herein provide systems and methods for streamlined and efficient creation of customized (e.g., web-based or mobile device based) applications using ledger templates with user-configured application elements. The technical solutions allow users to configure and customize applications to be generated by the system using ledger elements configurations (e.g., spreadsheet fields and their corresponding parameters) customizing particular application elements, such as data validation features, user interface prompts, menu selections, adaptive content features and application buttons. Organizations facing evolving objectives addressed by their applications can face challenges using their outdated applications to realize their goals, driving the demand for additional time consuming and costly application developments and updates.

The technical solutions described herein provide efficient, quick and streamlined development of customized applications, allowing users without having to write source code (i.e., computer instructions) to define, configure and customize elements of the application to be developed. The technical solutions described herein not only provide an improvement to computing technology, but are rooted in computing technology. The technical solutions described herein provide improvements to computing technology by speeding up the application development and configuration process, reducing costs and inefficiencies. The ledger-based template allows the user to define various elements or features of the application, such as data validation, user interface prompts, adaptive content, authorization, multilingual support, and version management. A metadata creator can receive the ledger template and translate the user-defined configurations into formatted metadata (e.g., metadata data structures) which can be stored in metadata storage. An application creator can then utilize the stored metadata data structures to assemble the application with the user-customized elements. In doing so, the present solution allows a user, who may have no prior application coding experience, to design, configure and produce their own web or mobile application tailored to desired objectives, as well as generate any updates to such application quickly and efficiently.

When enterprises operating across different regions use applications to implement their differing regional objectives (e.g., state regulations or local customer preferences), it can be difficult to implement such variations in a single application instance. For instance, an application using data structures to maintain user data that can vary in type or format across different regions or areas can convert some user data from one setting or data structure type to another in order to a local preference or demand. In such instances, the applications can experience increased resource consumption (e.g., processing power and memory) as well as delay due to conversion of data, formats or data structures, which can adversely affect user experience. In addition, as application data structures can be customized to conform to different regional preferences, errors can be inadvertently introduced into the application, which may not be detected or removed prior to deploying the application, thereby causing application crashes, vulnerabilities in the application, or the output or performance of erroneous actions by the application. The present technical solutions overcome these challenges utilizing validation rules to conform elements of a user-customized application in accordance with a metadata conversion protocol, thereby allowing for expedient development of user-customized application instances that satisfy regional objectives, while operating efficiently and conserving computing resources.

The technical solutions described herein facilitate a user (e.g., a designer not writing any application source code) to specify, define or otherwise configure elements of an application using spreadsheet fields and parameters. A data processing system of the solution can utilize its metadata conversion protocol to turn the spreadsheet-based element configurations into the desired features of the customized application. The data processing system can receive and parse the user-configured spreadsheet to identify and separate intermediary data structures corresponding to user-configured features from the spreadsheet. The data processing system can then configure and format the intermediary data structures in accordance with the model of the metadata to be stored and store them as metadata data structures into a metadata storage. The data processing system can validate user-defined configurations to check if they conform to the predetermined constraints, limitations or expected value or definition ranges. The data processing system can generate error messages and implement any corrections in response to the validation rules triggering actions to validate and/or correct the elements. The validated metadata data structures can then be used by the application creator and/or element functions to generate the customized application in accordance with the user-defined elements (e.g., configurations).

FIG. 1 is an illustrative example 100 of a system for automated generating of customized applications using ledger metadata templates in which a user can define and specify elements of the customized application to be produced. Example system 100 can include a user device 105 communicating with a data processing system (DPS) 125, via a network 102. User device 105 can include a ledger 110 (e.g., a spreadsheet) that can include one or more fields 115 and one or more parameters 120. DPS 125 can include one or more metadata creators 130 and one or more application creators 150. Metadata creator 130 can include one or more intermediary data structures 135, one or more metadata data structures 140 and one or more conversion functions 145. Application creator 150 can include one or more element functions 155, validators 160 comprising one or more validation rules 165 and applications 170 comprising one or more elements 175 defined by the parameters 120 in the fields 115 of the ledger 110.

Example system 100 can include any user device 105 via which a user (e.g., the application designer) can input parameters 120 into certain fields 115 to describe, specify, modify, adjust, or otherwise configure elements 175 (e.g., user interface features) of the application 170 to be generated. DPS 125 can receive the ledger 110 (e.g., spreadsheet) with the user provided parameters 120, via a network 102. Metadata creator 130 of the DPS 125 can parse the data in the ledger 110 and generate intermediary data structures 135. Conversion functions 145 can utilize the intermediary data structures 135 to generate or produce metadata data structures 140 in conformance with the metadata conversion protocol. DPS 125 (e.g., metadata creator 130 or application creator 150) can utilize a validator 160 to correct any intermediary data structures 135 and/or metadata data structures 140 so that they conform to validation rules 165. Application creator 150 of the DPS can utilize element functions to produce, generate or configure elements 175 of the application 170, such as an application for state-based payroll services, state or country taxation services, employee benefits, human resource services or any other application.

Network 102 can include one or more types of networks that can be used for communication between a user device 105 and a DPS 125. Network 102 can include one or more Local Area Networks (LANs), which can be used within a limited geographical area, such as an office or building, and Wide Area Networks (WANs), which span larger distances and can connect devices across cities or countries. Network 102 can include one or more Metropolitan Area Networks (MANs) which can be utilized to cover a city or metropolitan area. Network 102 can support internet-based connections, using protocols like TCP/IP, and enable access to cloud-based data processing systems. Network 102 can include or support wireless networks, such as Wi-Fi and cellular networks, as well as Virtual Private Networks (VPNs) which can provide security to public networks. Network 102 can include or utilize Intranets (e.g., private networks within an organization) facilitating internal communications.

User device 105 can include any combination of hardware and software (e.g., a computing device) which a user can utilize to generate and send a ledger 110 (e.g., spreadsheet). User device 105 can include a personal computer (e.g., a laptop or a computer station), a tablet, a smartphone or any other device that can communicate with a DPS 125. User device 105 can include applications or software for utilizing, opening, editing or generating ledgers 110 and configuring elements 175 of the application 170 using parameters 120 (e.g., values in particular fields of the spreadsheet) to select, unselect, specify, modify, create or otherwise manage any element 175 (e.g., feature) of the application 170, via the ledger 110.

Fields 115 can include any portion of a ledger 110 corresponding to a component of an application 170 to be generated by a DPS 125. Field 115 can include a location or portion of a ledger 110, such as an intersection of a column and a row of a worksheet in a spreadsheet. Field 115 can correspond to an element 175, such as a component and feature providing a functionality and user experience of a generated web or mobile application 170. Fields 115 can be used to configure specific elements 175 of the application 170, such as user interface data input fields, prompts, dropdown menus, and buttons, which users of the application 170 can utilize to provide input or trigger actions. For example, a field 115 can include a parameter 120 (e.g., an input value) that can define, specify or configure the element 175 of the application 170, such as a product search field or filter that a user can configure using one or more parameters 120 of the ledger 110.

Fields 115 can correspond to a variety of elements 175. For example, a field 115 can correspond to a data validation mechanism that can allow that user inputs (e.g., in the ledger 110) adhere to specified rules. For instance, field 115 can correspond to a data validation mechanism to validate an email address to produce a correct format of the input. Field 115 can correspond to an adaptive content feature that can include a dynamically displayed or hidden element or feature, which can be displayed or hidden, based on prior user selections. For example, field 115 can correspond to an adaptive content element that can include a follow-up question to be provided as a prompt, based on a user response to a prior prompt. Field 115 can correspond to an authorization feature that can control user access levels, such as to allow certain fields to be read-only or edited only by authorized users. Field 115 can correspond to a feature for selecting a particular language, from a plurality of languages that can be used for the content of the application. Field 115 can correspond to any features of an application (e.g., data validation, adaptive content, user menus or prompts) or any other functionalities for configuring the application 170.

Ledger 110 can include a combination of hardware and software providing digital tables with fields organized in columns and rows to organize, store, and manipulate data. Ledger 110 can include a spreadsheet, a file, a form, a data structure or any other form of data file or input. In some examples, ledger 110 can be referred to as a spreadsheet 110. Ledger 110 can include functionality to allow users to input, edit, delete, move, manipulate, analyze, and present information (e.g., data, parameters or values) in a structured format. Ledger 110 can include functionality for organizing, storing, and manipulating data in a tabular format or environment. Ledger 110 can include, be configured as, or provide a metadata configuration template for developing custom applications. Ledger 110 can include functionality to allow users, including application designers, to configure various application elements 175 by specifying parameters 120.

Parameters 120 can include values, characters or selections within fields 115 of the ledger 110 to select, activate, deactivate, configure, specify, create, modify, delete or otherwise manage any element 175. Parameter 120 can include variables or values within a ledger 110 that can be adjusted or configured to influence application 170 behavior or configuration (e.g., elements 175). Parameter 120 can include a user-defined setting determining one or more features of web or mobile applications 170, such as data validation rules, user interface components, adaptive content conditions, and authorization levels.

The ledger 110 can be, for example, a spreadsheet 110 with one or more sheets (e.g., worksheets) to allow users to categorize sections (e.g., particular features described within particular worksheets), set default values, establish data validation, and even create adaptive relationships between fields. Additionally, the spreadsheet stores information about application versions and can facilitate multi-lingual configurations. Through this spreadsheet-based approach, users without extensive application development knowledge can efficiently generate personalized instances of web or mobile applications, effectively streamlining the application design process while addressing various challenges associated with data capture and application customization.

For example, ledger 110 can include any number of features or functions. For example, users (e.g., application designers) can create, select, define or configure fields 115 of multiple types, such as free-text fields for free-text prompts, radio-type selection buttons, drop-down menus, date features, static or dynamic table grids etc. The ledger 110 templates can allow users to select, define, create or configure static/dynamic picklist for drop-down/radio. For instance, users of the ledger 110 can configure or set whether an application user can add/remove rows/columns of table, edit individual rows or edit all rows etc. The ledger 110 can allow the users to categorize fields in sections & sub-sections, across multiple pages in application, as well as provide help-text for every field or features of the application 170.

Ledger 110 can include data (e.g., fields 115 and parameters 120) with validation features or functions for validating data. For instance, ledger 110 can include functionalities to allow users to provide validation rules 165 and display on-screen errors for user. For instance, a user of the ledger (e.g., a designer) can provide complex validations (e.g., validation rules 165) for individual field 115 e.g., char length, data format/type, input restrictions etc. Data validation features (e.g., validation rules 165) can include data recommendation features of functions. For instance, ledger 110 can allow designers to configure default values or provide field-mapping for data recommendation. The user can map fields across different sections of the ledger or across different applications (e.g., different instances or variations of the application), to allow the users of related applications to not provide data to similar fields, if a user already included an entry or setting in a similar field in any other section within same application or within a different application (e.g., a different variation or version of the same application).

Ledger 110 can include authorization features, such as features or functions including ability to restrict access to specific fields 115 e.g., read-only, edit etc. Ledger 110 can include adaptive content features (e.g., elements 175 with adaptive content output). This can include features or functions allowing the user to select, specify or configure fields in adaptive fashion. For example, adaptive content function can show to the user a next field on the basis of answer provided in a previous field. For example, if answer to a prior question is Yes, then the next field can include a first type of follow-up prompt or output, and if the answer was No, then the next follow up can be a different window or prompt. For instance, spreadsheet 110 can allow for configuring a drop-down menu of next field that can be shown on the basis of a previous answer (e.g., in a prior field). For example, if a user has chosen "Asia", as "Region", a next field "Country" can show only Asian countries. For example, if a list of contacts is provided in a first field, then those contacts can come in drop-down options for the next related fields.

Ledger 110 can include multilingual support, including for example the ability to configure application in multiple languages. Ledger 110 can include version management, including for example the ability to maintain versions of application, and tag multiple applications to same configuration.

Ledger 110 can be used as an input into a metadata creator 130 to produce metadata components (e.g., MDS 140) that can be then used by an application creator 150 to assemble the application 170. A designer can select, specify, designate, set, customize or configure metadata (e.g., MDS 140) using worksheets for each element or feature. For example, the ledger 110 can include a configuration details worksheet in which a user can specify or configure one or more configuration details, such as a list of applications for which configuration can be done in workbook, and a version detail for each application 170.

Ledger 110 can include a worksheet on a section hierarchy that can include settings for hierarchy of sections or sub-sections of the application 170. Ledger 110 can include a worksheet on section details, including configurations at section-levels. Ledger 110 can include a worksheet on content, which can include a list of all fields, along with section details, default values, help-text, mandatory restrictions, authorization, mapping of fields from data sources (for recommender system) for each field. Ledger 110 can include a worksheet on global picklist, including a list of generic drop-down options, e.g., list of countries, along with adaptive configurations. Ledger 110 can include a worksheet on local picklist, including a list of field-specific drop-down options, along with adaptive configurations. Ledger 110 can include a worksheet on multi-lingual configuration, including language related configurations and translations for all fields. Ledger 110 can include a worksheet on data validations, including list of data validations for fields. Ledger 110 can include a worksheet on adaptive configuration, including list of all mapping configurations needed for adaptive behavior of application 170.

Data processing system (DPS) 125 can include any combination of hardware and software for producing or generating an application 170 (or version or instance thereof) based on user-specified (e.g., parameters 120) configurations of elements 175. DPS 125 can include any computer code, functions and data processed or executed on one or more servers, virtual machines, Software as a Service (SaaS), cloud-based systems or any other computing environment. DPS 125 can receive, parse and process ledgers 110 (e.g., parameters 120 and field 115 defining or configuring elements 175).

DPS 125 can include a metadata creator 130 that is designed, constructed and operational to receive, parse and process parameters 120 from fields 115 defining elements 175 into intermediary data structures 135. DPS 125 can utilize conversion functions 145 operating in accordance with metadata conversion protocol to convert the intermediary data structures 135 into metadata data structures 140 formed or configured in accordance with the metadata model 330 to be used for generating the application 170. DPS 125 can include application creator 150 utilizing element functions 155 to convert metadata data structures 140 into elements 175 of the applications 170.

Metadata creator 130 can include a combination of hardware and software for converting us central solution component that translates user configurations from the ledgers (e.g., fields 115 and parameters 120) into structured metadata. Metadata creator 130 can include the functionality to parse fields 115 and parameters 120 from ledger templates into intermediary data structures 135. For example, metadata creator can include a parser (e.g., 320) to separate sections of the ledger 110 into parts and identify which parts or portions of the ledger 110 correspond to configurations for elements 175. Metadata creator 130 can include the functionality (e.g., element functions 145) to convert the intermediary data structures 135 into metadata data structures 140, which can be organized to adhere to a predefined model (e.g., metadata model 330 for generating the applications 170 according to the user configurations).

Metadata creator 130 can implement a metadata conversion protocol to check, verify and implement conformance of the user-configured features (e.g., fields 115 and parameters 120) from the ledger 110 to the format used by the DPS 125 to generate the elements 175 and the application 170. The metadata conversion protocol can include a standardized set of rules and procedures governing the transformation of metadata from the fields 115 and parameters 120 defined by the user in the ledger 110 to the application 170 and its corresponding elements 175. For example, metadata conversion protocol can utilize parser to select and identify specific user-configured sections of the ledger 110 to form IDSs 135, utilize validator 160 to check conformance with validation rules 165, select conversion functions 145 for each of the IDSs 135 and generate MDSs 140 to be input into application creator 150 and element functions 155 to output application 170 with elements 175.

Intermediary data structure 135, also referred to as IDS 135, can include any data or information from the ledger 110 used for creating metadata data structure 140. IDS 135 can include references, identifications or descriptions of fields 115 and/or parameters 120. IDS 135 can include any systematic way of organizing and storing data in a memory, designed to facilitate efficient use (e.g., storage and retrieval) of the stored information. IDS 135 can include a format (e.g., systematic way) that corresponds to the data organized in the ledger 110. IDS 135 can include any combination of information from any number of fields 115 and/or values or characters of the parameters 120 from any number of worksheets.

Metadata data structure 140, also referred to as MDS 140, can include any data structure (e.g., formed or structured in accordance with a model for generating applications 170. MDS 140 can include any systematic way of organizing and storing data in a memory, designed to facilitate efficient use (e.g., storage, retrieval, or processing) of the stored information. MDS 140 can include a format (e.g., data organization and configuration) that corresponds to the data organized in accordance with the metadata model (e.g., metadata conversion protocol) to facilitate use of element functions 155. MDS 140 can include metadata for the application creator that can be used as input into element functions 155 to generate elements 175 according to definitions or configuration of the corresponding fields 115 and parameters 120.

Conversion function 145 can include any combination of hardware and software for converting intermediary data structure 135 into a metadata data structure 140. Conversion functions 145 can include any number of functions (e.g., pre-configured or customized) for particular elements 175. Conversion function 145 can be selected by the metadata creator 130 for a particular IDS 135, to convert the given IDS 135 of a particular type (e.g., drop-down menu, adaptive content prompt, authorization prompt, etc.) into a MDS 140 for that particular element 175. For example, a conversion function 145 can convert the format of a particular parsed section of the ledger 110 (e.g., user configured portion of the spreadsheet 110 corresponding to a certain IDSs 135) into a MDS 140 conforming to the format, attributes and other features of a particular element function 155 for the particular element 175. In doing so, conversion functions 145 can be used to trigger validator 160 to check IDSs 135 and/or MDSs 140 against validation rules 165 to verify conformance to the model for metadata used by the application creator 150 to generate the application 170.

Conversion function 145 can include rules or policies to convert particular fields 115 and their inputs (e.g., parameters 120) in accordance with particular settings or configurations to allow that the MDS 140 conforms to the metadata conversion protocol. Conversion functions 145 can be selected by the metadata creator 130 and/or application creator 150 for particular IDSs 135 based on the elements 175 to which such IDSs 135 correspond. For example, a user-configuration from the ledger 110 can correspond to a drop-down menu in the application 170. After generating an IDS 135 for the particular parsed section of the ledger 110 (e.g., the user-configuration for the drop-down menu) the metadata creator 130 can identify a conversion function 145 for drop-down menu to create an MDS 140 for the drop-down menu, which can then be used by the application creator 150 to generate the element 175 as a part of the application 170.

Application creator 150 can include any combination of hardware and software for using structured metadata (e.g., MDS 140) from the metadata creator 130 to generate application 170 or a version or instance of the application 170. Application creator 150 can include any functionality for using structured metadata (e.g., MDS 140) from the metadata creator 130 to generate, produce or create features or components of the application 170 (e.g., elements 175). Application creator 150 can utilize element functions 155 selected by the application creator 150 for particular elements 175 to apply against the MDSs 140 configured by the metadata creator 130 for particular elements 175.

Application creator 150 can include the functionality for retrieving stored MDS 140 and apply behavior functionality, features and configurations to the application 170 to align user interactions and data inputs from the ledger 110 (e.g., fields 115 and parameters 120) with the features of the application 170. For example, application creator 150 can utilize a validator 160 to modify, adjust or conform any IDS 135 or MDS 140 to the format used by the conversion functions 145 or element functions 155. Application creator 150 can assemble elements 175 which can be generated from element functions 155, thereby outputting a customized application 170 in accordance with user configurations from the ledger 110 template.

Element functions 155 can include any combination of hardware and software for using metadata data structures 140 to produce, configure, adjust, modify or otherwise create elements 175 and/or portions of the application 170. Element functions 155 can include functions for user interface buttons, input fields, prompts, adaptive content features, language or translation features or any other functions or functionalities of the elements 175 described herein. Element functions 155 can use a validator 160 to determine that metadata data structure 140 complies with validation rules 165 prior to using the particular MDS 140 to generate an element 175.

Validator 160 can include any combination of hardware and software for validating fields 115 and parameters 120 for particular elements 175. Validator 160 can include and utilize validation rules 165 that can be configured to check whether particular inputs (e.g., fields 115 and/or parameters 120) conform to desired format of the MDS 140. For example, validation rules 165 can include constraints, limitations or ranges for particular parameters 120 in particular fields 115. Validation rules 165 can include the functionalities for checking whether user inputs or configurations conform to the specified constraints, limitations or ranges. Validator 160 can check each of the IDSs 135 or MDSs 140 to verify their conformance to the metadata model 330. For instance, validator 160 can check each MDS 140 for conformity with the model for metadata (e.g., implement metadata conversion protocol) and have metadata creator 130 make adjustments or corrections to any MDS 140 and/or IDS 135 that can include errors or deviations from the validation rules 165.

Application 170 can include any application produced by application creator 150. Application 170 can include elements 175 defined, configured or designed to facilitate specific functionalities as described in the ledger 110. Application 170 can include any computer executed software application for servicing users, such as employees of an organization or enterprise, customers of the organization or enterprise, or any other person interacting with the application. For example, application 170 can include a payroll application to automate compensation calculations, tax deductions and direct deposits, a tax platform used to file taxes (e.g., with state or country) or access tax-related information or data, or a human resources management system that can centralize employee data, track performance, manage employee benefits or handle recruiting process. For example, application 170 can include an application for a time and attendance software to monitor hours, work progress or attendance, a benefits application for managing employee health insurance, retirement and other benefits, or an expense reimbursement application to facilitate the process of employee reimbursements. For example, application 170 can include a cloud-based software application for collaborative document editing, accessing media streaming data (e.g., videos or audio recordings), or e-commerce application to make purchases. It is understood that the above are some examples and that the application 170 can include any other type of computer program.

Application 170 can include, for example, elements 175 having data input fields allowing users to provide information, user prompts that guide their actions, dropdown menus enabling selection among options, and buttons triggering various actions. Application 170 can include elements 175 having an expense tracking application, users can input expense details, prompted by user-friendly instructions, and select expense categories from dropdown menus while utilizing buttons to save or submit entries. Elements 175 can include user interface components working in tandem with adaptive content, which dynamically adjusts the displayed elements based on user inputs or choices. For example, in a survey application, if a user selects a specific answer, the subsequent question displayed can change based on the user's prior selection. Application 170 can combine and include any number of elements 175 to deliver a customized solution based on user's objectives and preferences. It is understood that the above are some examples, and that the application 170 can include different and/or additional elements in other aspects.

Figure 2:
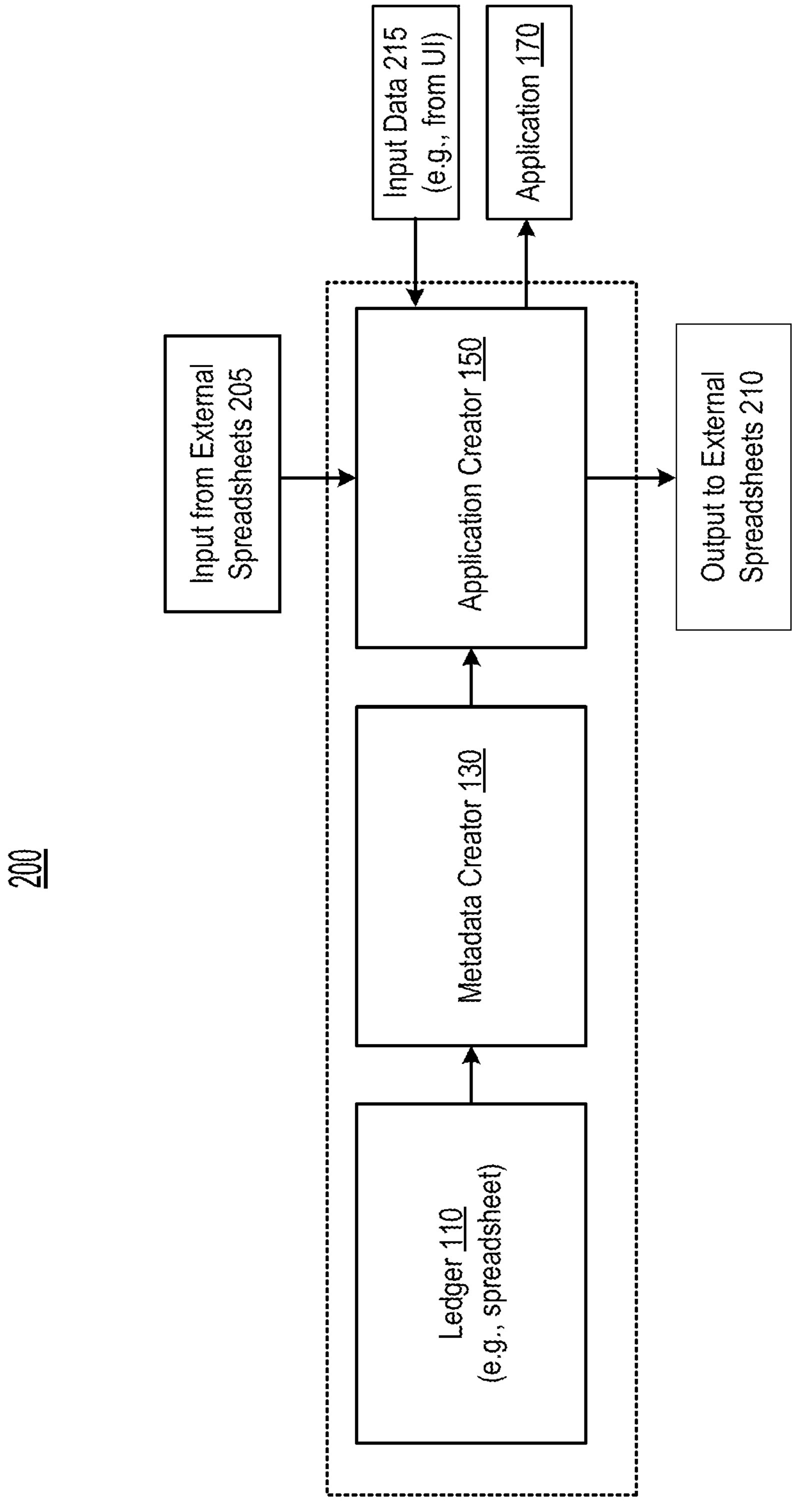
FIG. 2 illustrates an example system for automated generating of customized applications via a ledger (e.g., a spreadsheet) that uses external inputs from other spreadsheets and provides external outputs for other customized spreadsheets.

FIG. 2 illustrates an example system 200 for automated generation of customized application 170 via a ledger 110 (e.g., spreadsheet 110) that uses external ledger inputs, such as spreadsheet inputs 205 from other ledgers 110 and provides external spreadsheet outputs 210 for other customized ledgers 110. Example system 200 facilitates a user (e.g., designer using the spreadsheet 110) to configure spreadsheet-based metadata configuration template (e.g., spreadsheet 110), and provide list of fields 115, along with field-level configurations, such as validations, picklist, authorization parameters and rules and menu configurations. The user can upload spreadsheet 110 to metadata creator 130. Metadata creator 130 can convert the user-provided configurations to metadata (e.g., MDS 140) and store them in metadata storage (e.g., database or storage device). Application creator 150 can fetch the metadata (e.g., MDS 140) to render and apply behavior to user-facing application. Application creator 150 can program the application using selected functions corresponding to the metadata, such as functions to respond interactively to user options, inputs and context.

Example system 200 can include the application creator 150 that receives and uses data from other data sources, such as inputs from external spreadsheet 205. Inputs from external spreadsheets 205 can include fields 115 and/or parameters 120 (e.g., settings or configurations) for features in other applications 170 and/or spreadsheets 110. For example, input from external spreadsheet 205 can include configuration parameters 120 and/or fields 115 of related applications (e.g., other versions or revisions of the same application) or static master data that can be copied into any new application 170 being generated. Input from external spreadsheet 205 can be used to provide data recommendations to end-users, such as features previously used for same or similar types of applications 170.

Application creator 150 can provide output to external spreadsheets 210. Output to external spreadsheets 210 can include features or configurations (e.g., fields 115 and/or parameters 120) for features of the application 170 being generated, which can be used in other applications 170. Output to external spreadsheets 210 can include any feature or characteristic as those in input from external spreadsheets 205.

Application creator 150 can receive input data 215 from user interface. Input data 215 can include any feedback, responses or data from users or designers in response to prompts or error messages. Input data 215 can include user selections, clarifications or corrections in response to validation feedback (e.g., violation of validation rules 165). Input data 215 can be used to prompt for data or information for finalizing the application 170 by the application creator 150.

Figure 3:
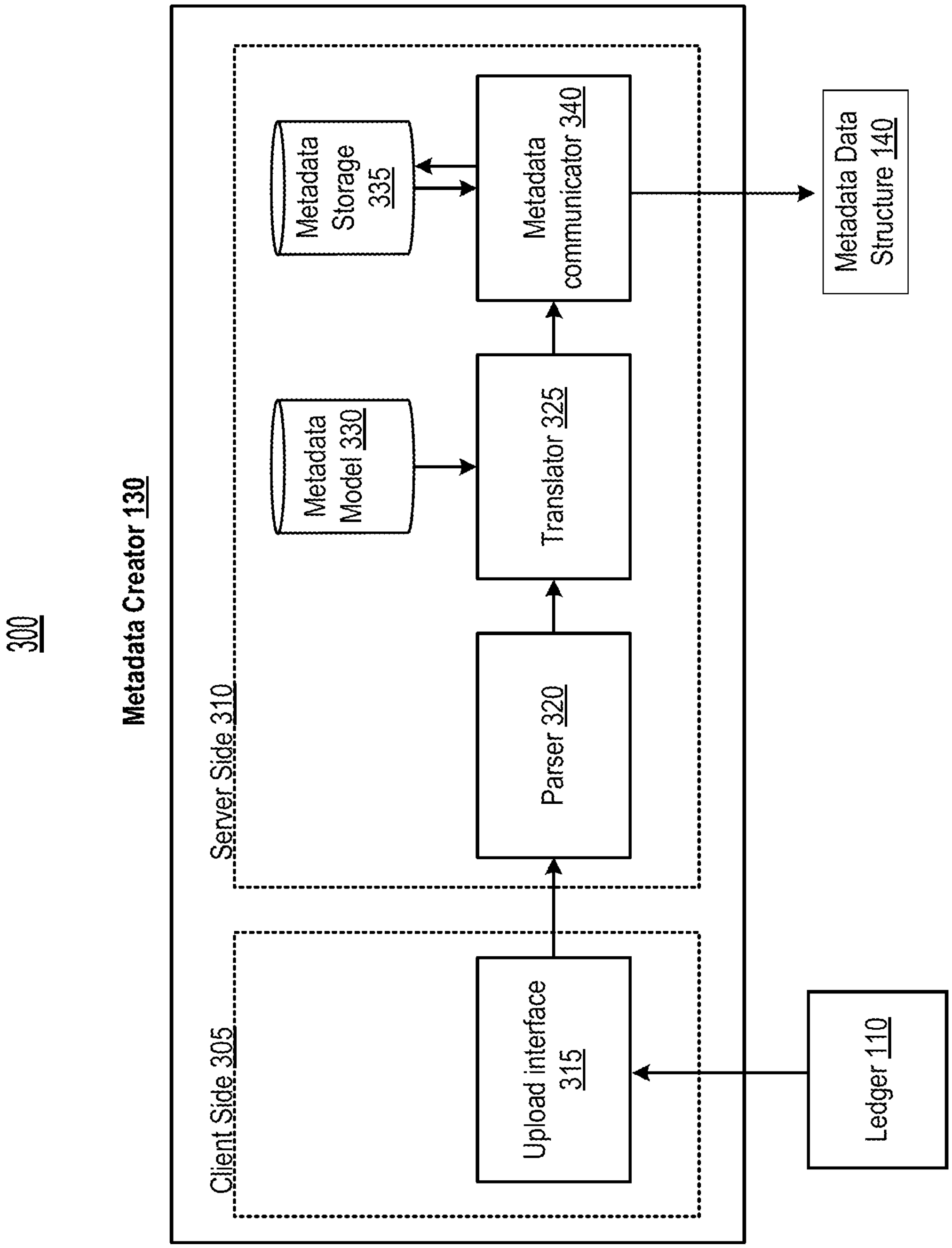
FIG. 3 illustrates an example block diagram of a metadata creator for creating metadata to be used for application generation.

FIG. 3 illustrates an example block diagram 300 of a metadata creator 130 for creating metadata (e.g., MDSs 140) to be used for application generation. As shown in block diagram 300, metadata creator 130 can include any combination of hardware and software for creating metadata from configurations in the ledger 110 (e.g., spreadsheet 110). Metadata creator 130 can include, for example, a client side functionality 305 and a server side functionality 310, each having one or more components or functionalities.

For example, a client side functionality 305 of metadata creator 130 can include one or more interfaces for communicating with the designer (e.g., user providing the spreadsheet 110 with configurations for creating the application 170). Client side functionality 305 can include an upload interface 315. Upload interface 315 can include any interface (e.g., user interface) for receiving spreadsheet 110 from the user device 105 and communicating with the user (e.g., providing feedback, error messages, prompts or any other information). For instance, upload interface 315 can include functionality for validating the file type, file size, features and metadata (e.g., metadata elements or features) provided in the spreadsheet. Upload interface 315 can include the functionality for flagging or identifying for the user (e.g., designer of the spreadsheet) any errors identified during the upload of the spreadsheet.

Server side functionality 310 of the metadata creator 130 can include a parser 320, a translator 325, a metadata model 330, a metadata storage 335 and a metadata communicator 340. Parser 320 can include any combination of hardware and software that analyzes and interprets structured data, such as code or markup. Parser 320 can include the functionality to extract information or facilitate further processing. Parser 320 can traverse through all columns and rows within the worksheets in the spreadsheet 110 and convert the data (e.g., configured fields) into intermediary objects (e.g., IDSs 135). Intermediary objects (e.g., IDS 135) can include temporary data structure that can be used in parsing to transform raw input data from a spreadsheet-based configuration template (e.g., 110) into a more suitable format for further processing, encompassing data records, validation rules, hierarchical representations, mappings, error logs, and language translations. Parser 320 can validate for any template errors and return them to upload interface 315.

Intermediary objects (e.g., IDSs 135) can be used during parsing to transform raw input data from the spreadsheet-based configuration template into a format more suitable for subsequent processing (e.g., processing by translator 325). IDSs 135 can include data records that hold extracted information from spreadsheet fields, validation rule structures, hierarchical representations for sections, mappings for adaptive content, error logs for template validation, or language translations for multi-lingual configurations. Intermediary object (e.g., 135) can act as a bridge between the initial data and the final processed output, aiding in organizing, validating, and facilitating smoother data manipulation and transformation during the parsing process.

Translator 325 can include any combination of hardware and software for translating intermediary objects to a metadata object (e.g., MDS 140) configured for a pre-defined metadata model 330. The metadata model can include a structured representation of data that conforms to the pre-defined metadata model 330, which can define or include a set format, structure, and attributes of the metadata (MDSs 140) to conform to the metadata conversion protocol. Metadata objects (e.g., MDSs 140) can include a processed and organized form of data that captures specific information according to the rules set by the metadata model (e.g., metadata conversion protocol). For example, a metadata model 330 can include a model configured for a particular application (e.g., tax compliance, or state compliance or duties). The metadata objects (e.g., MDSs 140) can include attributes such as names or types of duties or rule for a particular state, types of taxes levied in that state, categories, availability, and a brief description. The values in the metadata object can be held or provided in a structured and standardized way to represent and store product information in conformance with the metadata conversion protocol. Translator 325 can validate for any errors in the input and return any identified errors to upload interface via parser 320. Translator 325 can store the metadata objects (e.g., MDSs 140) in metadata storage 335 using metadata communicator 340.

Metadata communicator 340 can include any combination of hardware and software for persisting and retrieving metadata (e.g., MDSs 140) from metadata storage 335. Metadata communicator 340 can include functionality for storing MDSs 140 into storage or retrieving metadata per requests such as application programming interface (API) calls. Metadata storage 335 can include any storage for storing metadata used by application creator to render or create the application. Metadata storage 335 can include data structures for storing metadata (MDSs 140) and/or intermediary objects (e.g., IDSs 135) and providing them, via metadata communicator to any function of the metadata creator 130 and/or application creator 150.

Figure 4:
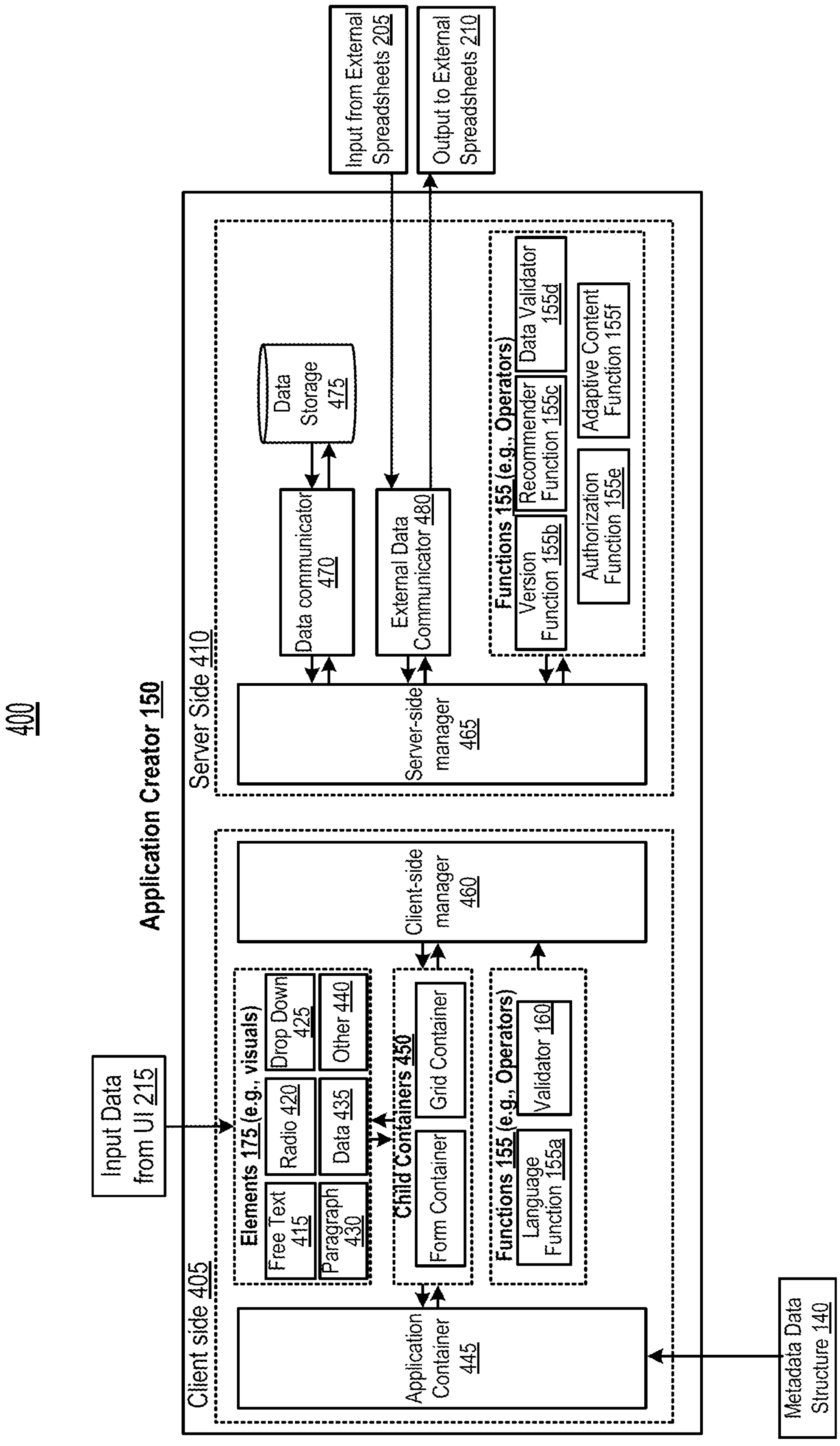
FIG. 4 illustrates an example block diagram of an application creator for generating applications.

FIG. 4 illustrates an example block diagram 400 of an application creator 150 for generating applications 170. Application creator 150 can include a client side functionality 405 of the application creator 150 and a server side functionality 410 of the application creator 150. Client side functionality 405 of the application creator 150 can include an application container 445 that can include any combination of hardware and software for fetching dividing the metadata (e.g., MDSs 140 or IDSs 135) into sections and sub-sections. Application container 445 can provide sections and sub-sections of metadata to child containers 450. Child containers 450 can include any combination of hardware and software for receiving metadata from application container and for interacting with the client-side data manager 460. Child containers 450 can generate, produce or render elements 175, such as visual components. Elements 175 can include, for example, any user interface elements or features, such as a free text feature 415 for allowing user to input text to be displayed in the application 170. Elements 175 can include, for example, radio buttons 420 for user to click on or select. Elements 175 can include, for example, drop-down menus 425 for user to select. Elements 175 can include, for example, paragraphs, dates and any other user interface elements of an application to receive and capture the user inputs at the browser or mobile application 170 and provide them to the corresponding child container 450. Above examples of elements 175 are not limiting, and other types of elements 175 may be used in other aspects of the technical solutions described herein.

Client-side manager 460 can include any combination of hardware and software to fetch or push data to server-side manager, applies value added operations and provides data to child containers. Element functions 155, also referred to as operators 155, can include language controllers and data validators. Data validators (e.g., validator 160) can include functionality to validate input data against configured as well as pre-defined platform model rules. Language controller (e.g., 155*a*) can include the functionality or function that controls and/or provides the content in the language, as selected by the user in the ledger 110 (e.g., spreadsheet).

Server side of the application creator can include a server-side manager 465 that can include the functionality to fetch or push data from internal/external data sources. Server side manager 465 can apply server-side value added operations. Server side manager 465 can support data interaction from client-side manager 460. Data communicator 470 can include the functionality that fetches or pushes data from internal/external ledgers 110 (e.g., input from external spreadsheets 205 and output to external spreadsheets 210) and supports server-side manager 465.

Element functions 155 (e.g., server-side operators) can include several functions addressing various features of the application 170. Element functions 155*b*-155*f* can include a version manager (e.g., version function 155*b*) to maintain application configuration with version history. Server-side operators (e.g., functions 155) can include an adaptive content function 155*f* that can control content based on config and user input. Server-side operators can include authorization function 155*e* that can maintain accessibility. Server-side operators can include a recommender function 155*c* that can map data from multiple data sources (provided in metadata template) to provide default values or provide an option to user to choose from recommended values based on data filled in other integrated applications. Server side operators can include a data validator 155*d* to validate any input data from external ledgers (e.g., inputs from external spreadsheets 205) or user inputs.

Figure 5:
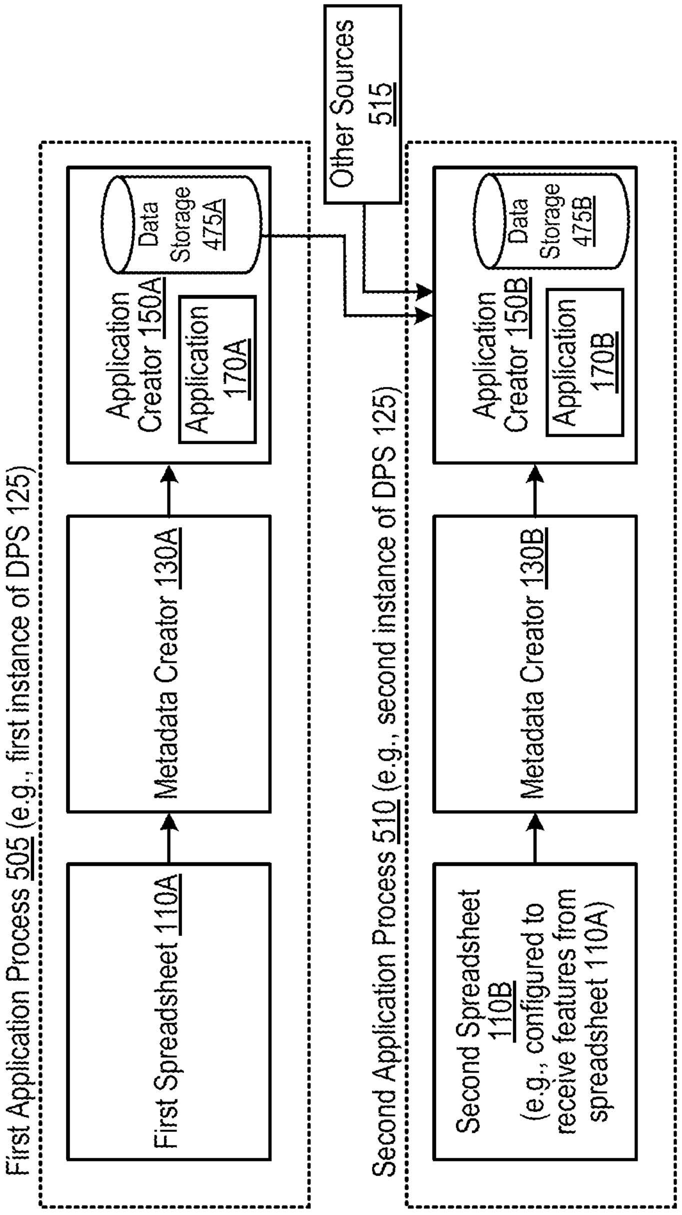
FIG. 5 illustrates an example system in which an application process generating an application can incorporate configurations from another application processes.

FIG. 5 illustrates an example block diagram 500 of a system in which an application process generating an application 170 can incorporate configurations (e.g., elements 175) from another application process (e.g., ledger 110) of another application 170. Example block diagram 500 can include a first application process 505 (e.g., a first instance of a DPS 125 executing an application) that can use a first spreadsheet 110A as input into a metadata creator 130A, from which metadata can be input into the application creator 150A to generate a first application 170A. Example block diagram 500 can also include a second application process 510 (e.g., a second instance of DPS 125 executing another application) in which a second spreadsheet 110B is input into a metadata creator 130B, from which the metadata can be provided to application creator 150B to output application 170B. Each one of the first application process 505 and second application process 510 can include a respective data storage 475 (e.g., 475A in application creator 150A and 475B in application creator 150B).

Application processes 505 and 510 can allow users to share, borrow, include or otherwise incorporate various configurations for various elements 175 from each other's processes (e.g., ledgers 110, metadata or applications 170). For example, first application process 505 can generate an application 170A having specific configurations based on the features of the first spreadsheet 110A. Second application process 510 can include a second spreadsheet 110B that can be configured to receive features (e.g., configurations from specific fields 115 and parameters 120) from the first spreadsheet 110A.

For example, first application creator 150A can provide, via data storage 475A, information or data, such as MDSs 140 corresponding to specific configurations or features of application 170A, which is to be included into the application 170B. Second application process 510 can receive the data from the data storage 475A and incorporate the desired features (e.g., as defined in the second spreadsheet 110B) into the application 170B. Second application process 510 can also receive data or information (e.g., MDSs 140) from other sources 515, such as for example, a database of MDSs 140 from any number of applications 170, which can be shared across any number of application processes or applications 170.

Figure 6:
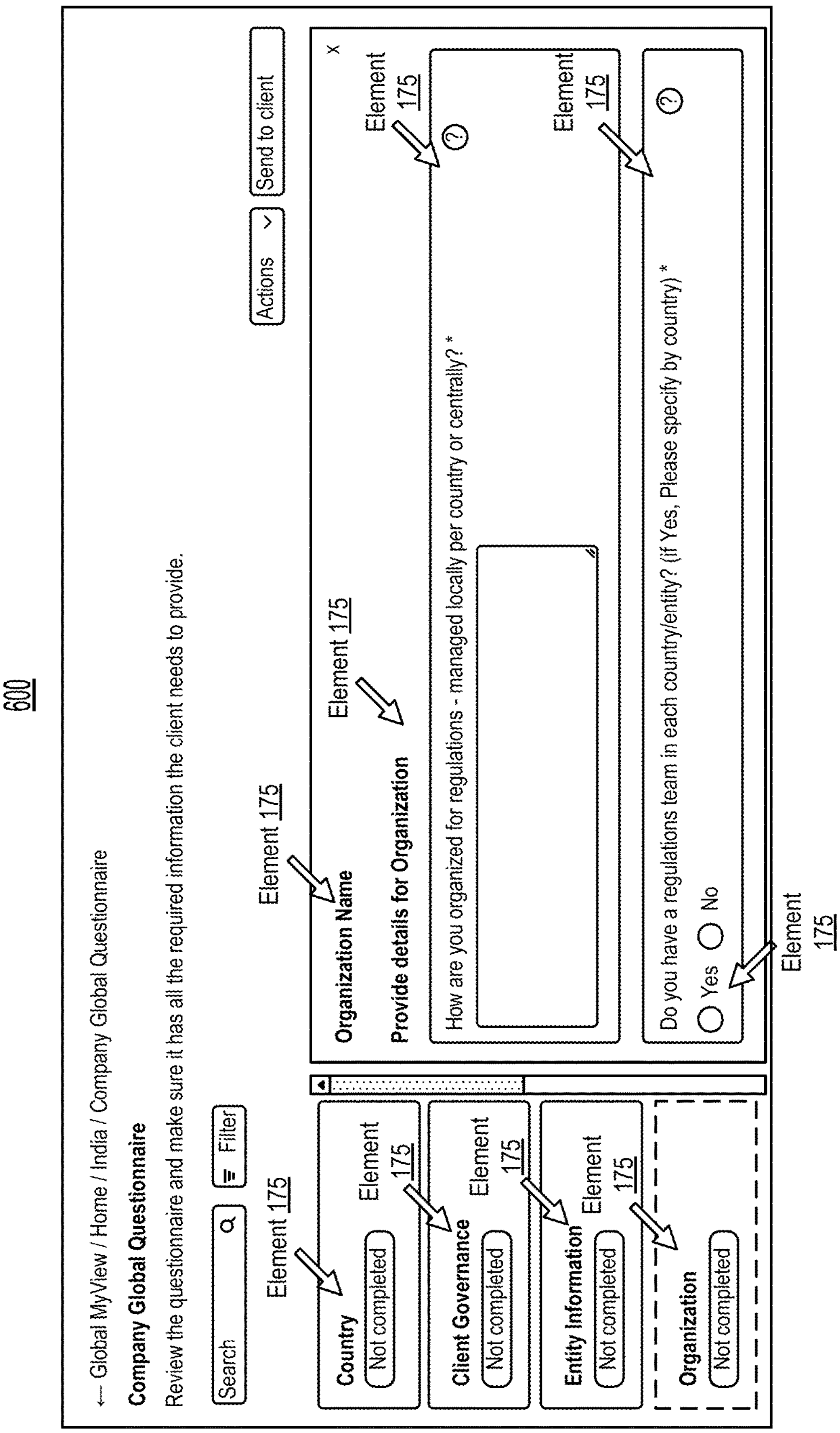
FIGS. 6-12 illustrate examples of a screenshots of an application having a variety of elements that are displayed via a user interface.

FIG. 6 illustrates an example of a user-interface 600 (e.g., screenshot) of an application 170 with various application elements 175 displayed. User interface 600 can be displayed on a user device 105, where user accesses and uses elements 175 of the generated application 170. Example user-interface 600 can include content of the application 170 seamlessly integrated using metadata (e.g., MDSs 140) processed by the systems of the present solution. Within the application interface, section elements 175 are presented on both the left menu and the top header. For example, an element 175 can include a feature labeled "Organization Name" which can be accompanied by a descriptive instruction. The questions presented in the application 170 can each be marked and denote desired responses from the user. Alongside each question, the help text feature, depicted by a question mark icon, can provide guidance to users. Elements 175 can include, for example, text boxes, radio buttons, and drop-down menus, for a "country", a "client governance", "entity information", and "Organization." Element 175 can include a defined option value such as "Yes" or "No." These elements 175 can be integrated into the user interface of the application 170 based on the configurations (e.g., fields 115 and parameters 120) input in the ledger 110.

Figure 7:
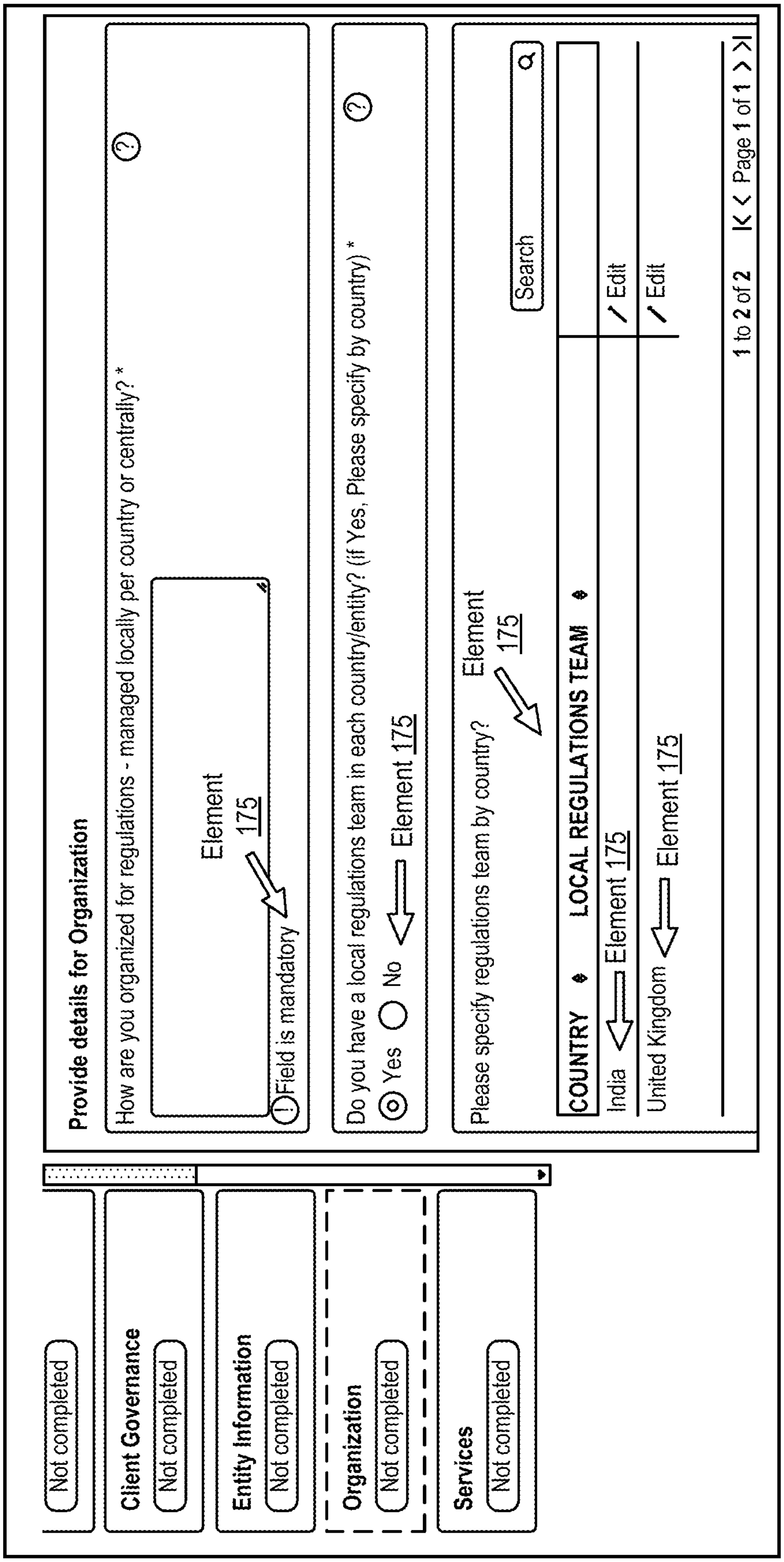

FIG. 7 illustrates an example of a user interface 700 (e.g., screenshot) of an application 170 with various elements 175 displayed. User interface 700 can include a validation indicating that a field is mandatory, and which can be established within the metadata configuration. Once a user responds to a question, the subsequent question can be determined based on their response of "Yes" or "No," which can also be elements 175 defined in the ledger 110. The metadata configuration (e.g., element 175) can further control the nature of the ensuing question, including its type as a grid, as well as specific details such as the number of rows and columns. These grid configurations can be either static, restricting the user's ability to add or delete rows, or dynamic, allowing for the addition or removal of rows. Metadata configuration (e.g., elements 175) can also include the designation of the pre-filling of the "Country" column by extracting data from other applications, providing recommendation features or selections, such as "India" or "United Kingdom" that the user can select.

Figure 8:
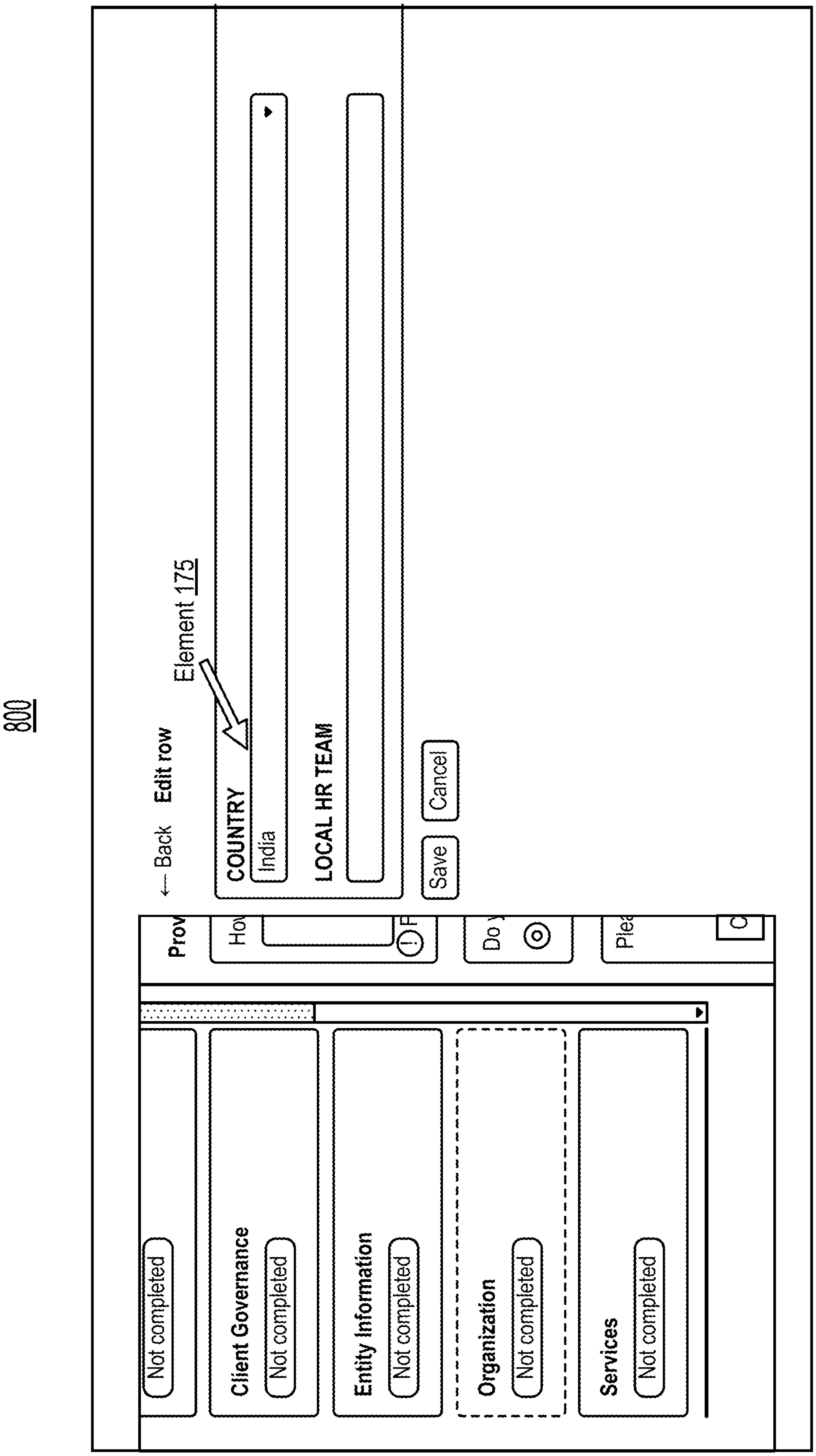

FIG. 8 illustrates an example of a user interface 800 (e.g., screenshot) of an application 170 with element 175 for access control displayed. User interface 800 can include a field or feature (e.g., element 175) that is configured as "read-only" or as "editable" via metadata of the ledger 110. For example, element 175 (e.g., "India") as a country selection can be designated as read-only, not allowing users to change the selection.

Figure 9:
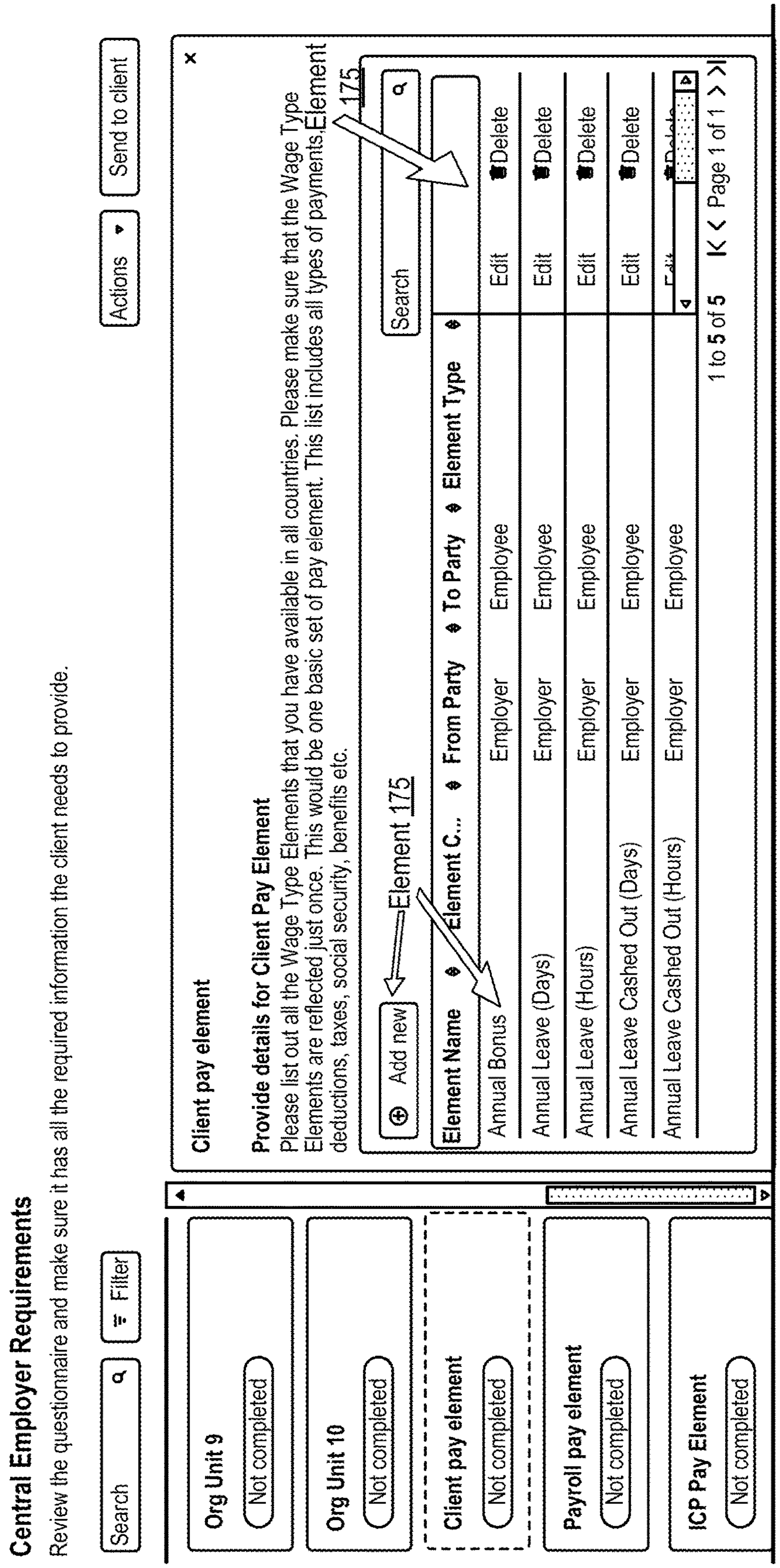

FIG. 9 illustrates an example of a user interface 900 (e.g., screenshot) of an application 170 displayed. User interface 900 can include elements 175 providing dynamic grids, allowing users to seamlessly add or delete rows as needed. For example, in the "Client Pay element" section, element 175 can allow users to input data into the "Element Name" column, which can be provided or materialized as a drop-down menu in the following section. This process can be implemented using metadata and configurations of the ledger 110.

Figure 10:
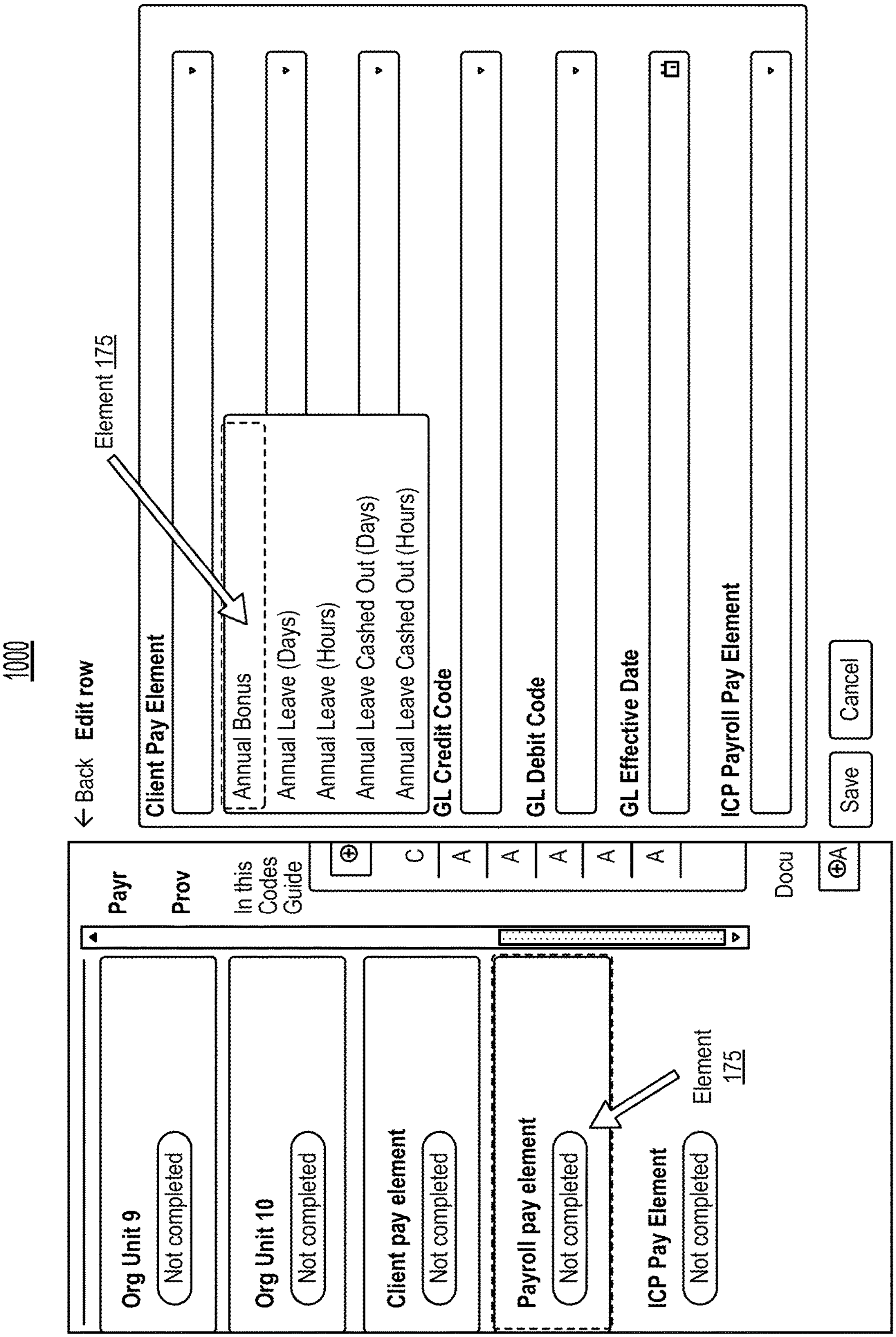

FIG. 10 illustrates an example of a user interface 1000 (e.g., screenshot) of an application 170 displayed. User interface 1000 can illustrate and example of a drop-down menu for "client pay element" field in a "Payroll pay element" section of the user interface of the application 170. The following elements 175 can be dynamically generated on the basis of values previously entered or selected by user in "Element name" in "Client pay element" section.

Figure 11:
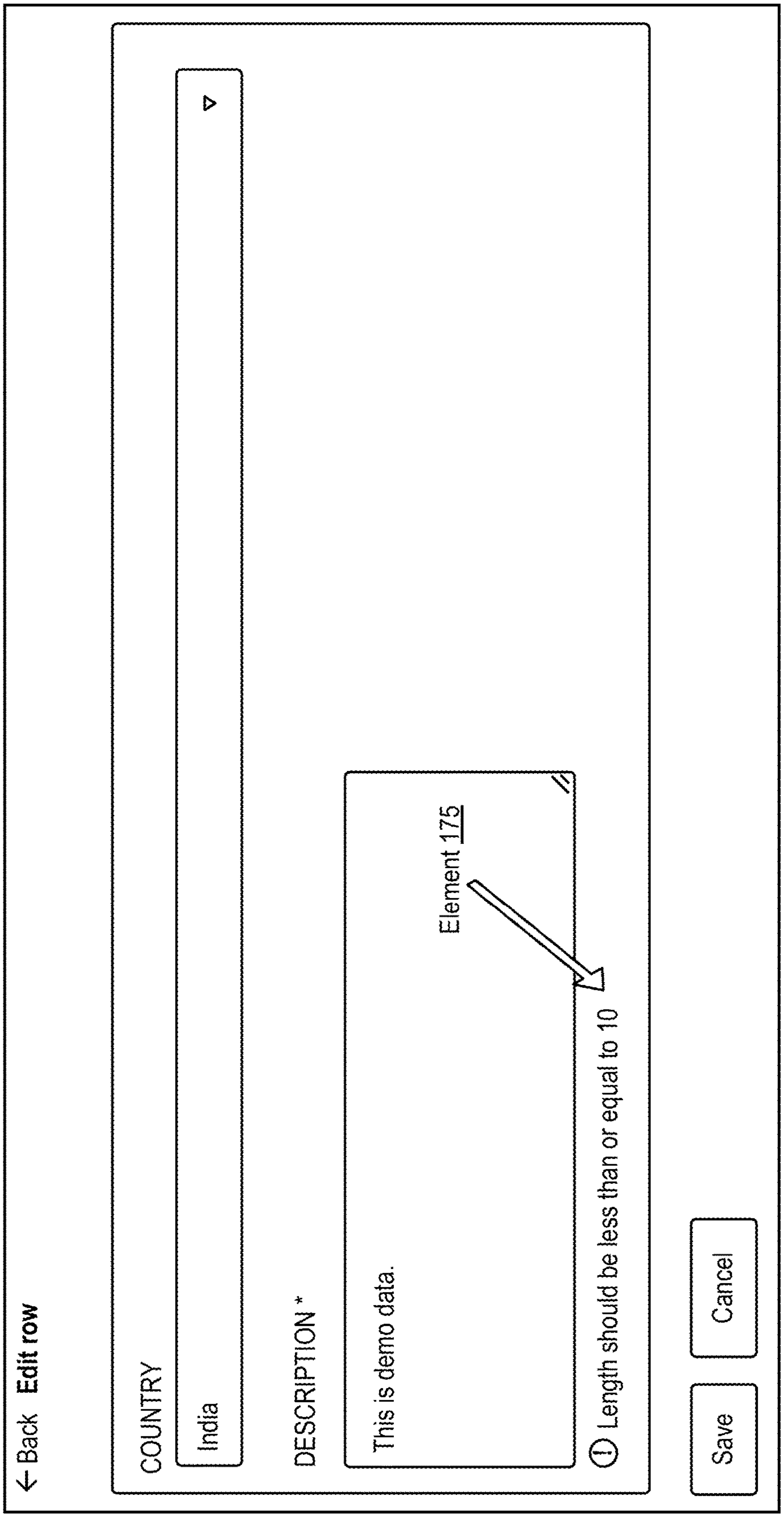

FIG. 11 illustrates an example of a user interface 1100 (e.g., screenshot) of an application 170 displayed. User interface 1100 can include, for example, element 175 corresponding to error message or feedback that can be generated when a validation rule 165 is violated, such as when a length of the input exceeds the allowed range.

Figure 12:
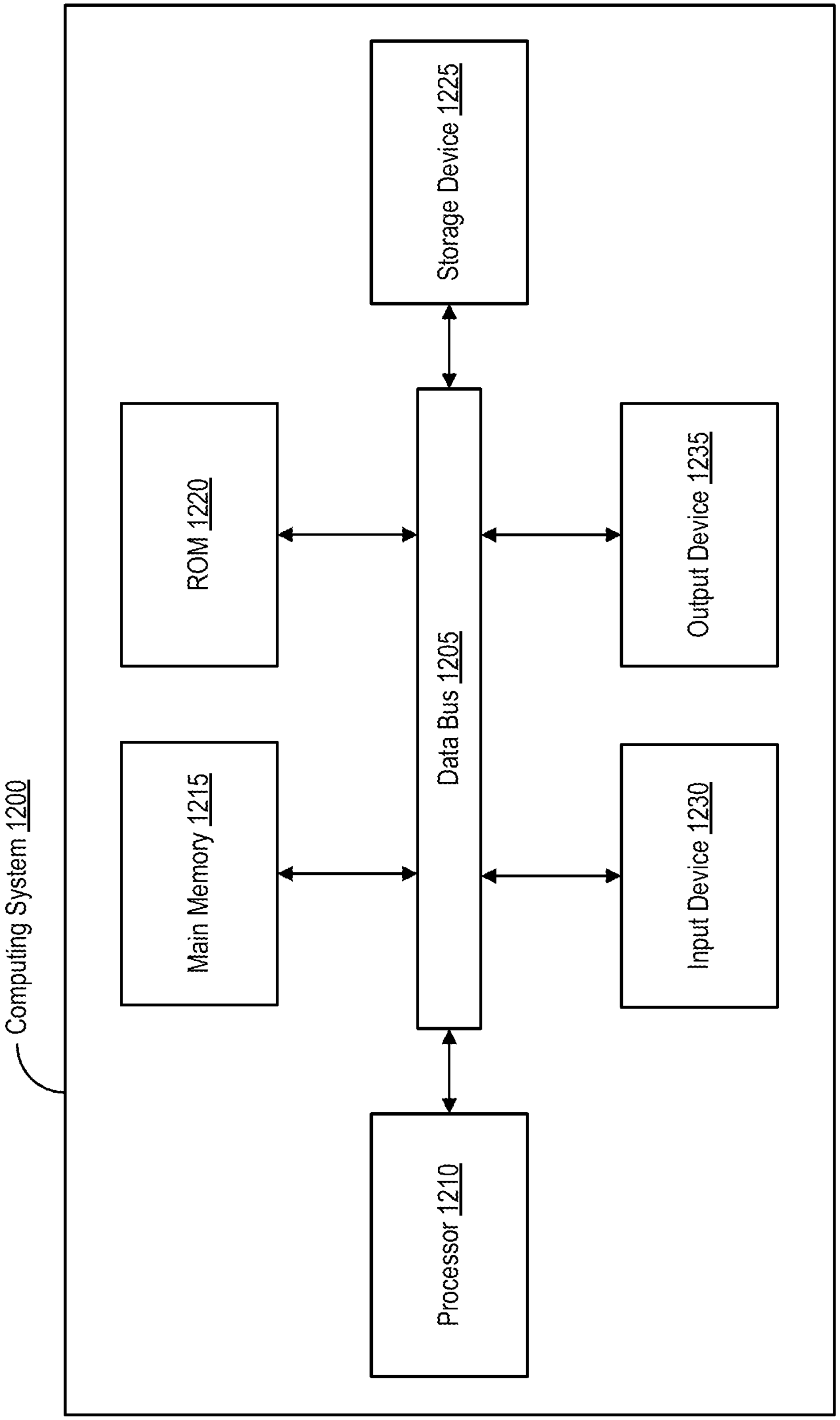

FIG. 12 illustrates a block diagram of a computing system 1200 for implementing the embodiments of the present solution, in accordance with embodiments. FIG. 12 illustrates a block diagram of an example computing system 1200, which can also be referred to as the computer system 1200. Computing system 1200 can be used to implement elements of the systems and methods described and illustrated herein, such as for example, commands, instructions or data described herein. Computing system 1200 can be included in and run any device (e.g., user device 105, DPS 125, metadata creator 130, application creator 150, or any other feature or component of example systems 100-500).

Computing system 1200 can include at least one bus data bus 1205 or other communication device, structure or component for communicating information or data. Computing system 1200 can include at least one processor 1210 or processing circuit coupled to the data bus 1205 for executing instructions or processing data or information. Computing system 1200 can include one or more processors 1210 or processing circuits coupled to the data bus 1205 for exchanging or processing data or information along with other computing systems 1200. Computing system 1200 can include one or more main memories 1215, such as a random access memory (RAM), dynamic RAM (DRAM), cache memory or other dynamic storage device, which can be coupled to the data bus 1205 for storing information, data and instructions to be executed by the processor(s) 1210. Main memory 1215 can be used for storing information (e.g., data, computer code, commands or instructions) during execution of instructions by the processor(s) 1210.

Computing system 1200 can include one or more read only memories (ROMs) 1220 or other static storage device 1225 coupled to the bus 1205 for storing static information and instructions for the processor(s) 1210. Storage devices 1225 can include any storage device, such as a solid state device, magnetic disk or optical disk, which can be coupled to the data bus 1205 to persistently store information and instructions.

Computing system 1200 may be coupled via the data bus 1205 to one or more output devices 1235, such as speakers or displays (e.g., liquid crystal display or active matrix display) for displaying or providing information to a user. Input devices 1230, such as keyboards, touch screens or voice interfaces, can be coupled to the data bus 1205 for communicating information and commands to the processor(s) 1210. Input device 1230 can include, for example, a touch screen display (e.g., output device 1235). Input device 1230 can include a cursor control, such as a mouse, a trackball, or cursor direction keys, for communicating direction information and command selections to the processor(s) 1210 for controlling cursor movement on a display.

The processes, systems and methods described herein can be implemented by the computing system 1200 in response to the processor 1210 executing an arrangement of instructions contained in main memory 1215. Such instructions can be read into main memory 1215 from another computer-readable medium, such as the storage device 1225. Execution of the arrangement of instructions contained in main memory 1215 causes the computing system 1200 to perform the illustrative processes described herein. One or more processors 1210 in a multi-processing arrangement may also be employed to execute the instructions contained in main memory 1215. Hard-wired circuitry can be used in place of or in combination with software instructions together with the systems and methods described herein. Systems and methods described herein are not limited to any specific combination of hardware circuitry and software.

Although an example computing system has been described in FIG. 12, the subject matter including the operations described in this specification can be implemented in other types of digital electronic circuitry, or in computer software, firmware, or hardware, including the structures disclosed in this specification and their structural equivalents, or in combinations of one or more of them.

In one example, the present solution can include a system, such as any system of 100-500 for generating applications 170 based on configurations provided by users in ledgers 110 (e.g., spreadsheets 110). System can include one or more processors 1210 that can be coupled with memory 1215. Memory 1215 can store instructions or commands to cause or configure processors 1210 to implement or execute features of the systems 100-500, such as any feature of the DPS 125.

For example, one or more processors 1210 can be configured (e.g., execute instructions or commands from the memory 1215) to identify a ledger 110. Ledger 110 can include, for example, a spreadsheet having one or more (e.g., a plurality of) parameters 120 for one or more (e.g., a plurality of) elements 175 of a user interface to control an application 170. For example, parameters 120 can be input in fields 115 of a ledger 110 to establish, describe, indicate, adjust, set or otherwise configure one or more elements 175 of an application 170 to be generated by the DPS 125.

One or more processors 1210 can be configured to construct, via a metadata conversion protocol, a plurality of metadata (e.g., MDSs 140) that can correspond to the plurality of elements 175 using the plurality of parameters 120. For example, one or more processors 1210 can implement a metadata conversion protocol or a process by which intermediary data structures 135 can be extracted from the ledger 110 and metadata creator 130 can construct metadata data structures 140 from the intermediary data structures 135.

One or more processors 1210 can be configured to adjust, based on a validation rule 165 corresponding to an element 175 of the plurality of elements 175, a metadata (e.g., MDS 140) of the plurality of metadata corresponding to the element 175. For example, an element 175 configured in the ledger 110 can include one or more validation features (e.g., validation rules 165 that can be used to set an acceptable constraint, range, limitations, use or structure of the element 175.

One or more processors 1210 can be configured to select a plurality of functions (e.g., element functions 155) corresponding to the plurality of elements 175. For example, the one or more processors 1210 can select conversion functions 145 corresponding to the plurality of elements 175. The selected functions (e.g., 145 and/or 155) can correspond to particular one or more elements 175, corresponding to one or more portions (e.g., fields 115) of the ledger 110.

One or more processors 1210 can be configured to generate, using the plurality of functions (e.g., 145 or 155), a version of the application 170 that is configured based at least on the plurality of elements 175. For example, the generated version of the application 170 can be configured with the user interface comprising the plurality of elements 175 based at least on the plurality of metadata (e.g., MDS 140) comprising the adjusted metadata (e.g., adjusted MDS 140).

One or more processors 1210 can be configured to receive the ledger 110 from a user device 105. One or more processors 1210 can be configured to configure the plurality of elements 175 based at least on the plurality of parameters 120. One or more processors 1210 to generate the plurality of metadata (e.g., MDSs 140) according to a format of a model (e.g., 330) for metadata and based at least on the configured plurality of fields 115. For example, the fields 115 can be configured with the parameters 120 defining the plurality of elements 175.

Ledger 110 can include a spreadsheet having a plurality of worksheets. Each of the worksheets can correspond to a respective element 175 of the plurality of elements 175. Each of the worksheets of the ledger 110 can include a respective parameter 120 selected by a user of the ledger 110 to configure the respective element 175. For example, ledger 110 can include a spreadsheet 110 having worksheets directed to particular features or functions (e.g., elements 175), such as user input prompts (e.g., drop-down menus), adaptive content prompts or inputs, user selection buttons (e.g., radio buttons), validation constraints or parameters, recommended features (e.g., features from other ledgers 110 recommended for use in the present ledger), free text features (e.g., features that the user can configure with own text) or any other feature or configuration discussed herein.

For example, the plurality of elements 175 can include any one of, or any combination of: an input from a second ledger 110 corresponding to a second application 170, a recommendation to a third ledger 110 corresponding to a third application 170, a visual component to display via a user interface of the application 170 (e.g., a menu or a button for a user interface), a hierarchical organization of portions of the application (e.g., adaptive content in which a prior input or selection by a user dictates the following content to be displayed), a field for input or selection by a user (e.g., a search function or a search bar), a selection for a drop down menu and a content provided based at least on a prior user selection.

One or more processors 1210 can be configured to identify, from the ledger 110, an authorization feature corresponding to the element 175. For example, authorization feature can indicate which user can access, edit, use or otherwise utilize which feature or element 175. One or more processors 1210 can determine, responsive to the authorization feature, that access to the element 175 is restricted. One or more processors 1210 can generate, responsive to the determination, the application 170 having the access to the element 175 restricted. For example, one or more users, or groups of users, can be restricted from usage, editing or accessing the element 175.

One or more processors 1210 can be configured to identify, from the ledger 110, a field 115 corresponding to an adaptive content element to modify a second (e.g., following) prompt to a user of the application 170 based at least on a response of the user to a first (e.g., prior) prompt of the application 170 preceding the second prompt. One or more processors 1210 can be configured to generate the application 170 comprising the first prompt and the second prompt and the adaptive content element. For example, the adaptive element can include the configuration in which the second prompt can include content that is modified, changed or selected based at least on the selection of the user in response to the first prompt.

One or more processors 1210 can be configured to parse the plurality of elements 175 from the ledger 110 to generate the plurality of metadata (e.g., MDSs 140) in accordance with one of a format, a structure or an attribute of a model (e.g., metadata model 330). One or more processors 1210 can be configured to store the plurality of metadata (e.g., MDSs 140) in a database (e.g., storage). Each of the plurality of metadata (e.g., MDSs 140) can be corresponding to each of the plurality of elements 175. One or more processors 1210 can be configured to generate the application 170 according to the model (e.g., 330).

One or more processors 1210 can be configured to identify, from the ledger 110, a parameter 120 for a second element 175 of the plurality of elements 175 indicating a language for the application 170. One or more processors 1210 can be configured to generate the application 170 having content of the plurality of elements 175 provided in the language indicated by the parameter for the second element 175. One or more processors 1210 can be configured to generate, based at least on a field 115 of the ledger 110 corresponding to an element 175 of the plurality of elements, an intermediary data structure 135. One or more processors 1210 can be configured to convert the intermediary data structure 135 into a metadata data structure 140 in accordance with a format of a model (e.g., 330). One or more processors 1210 can be configured to generate the application 170 using the metadata data structure 140.

Figure 13:
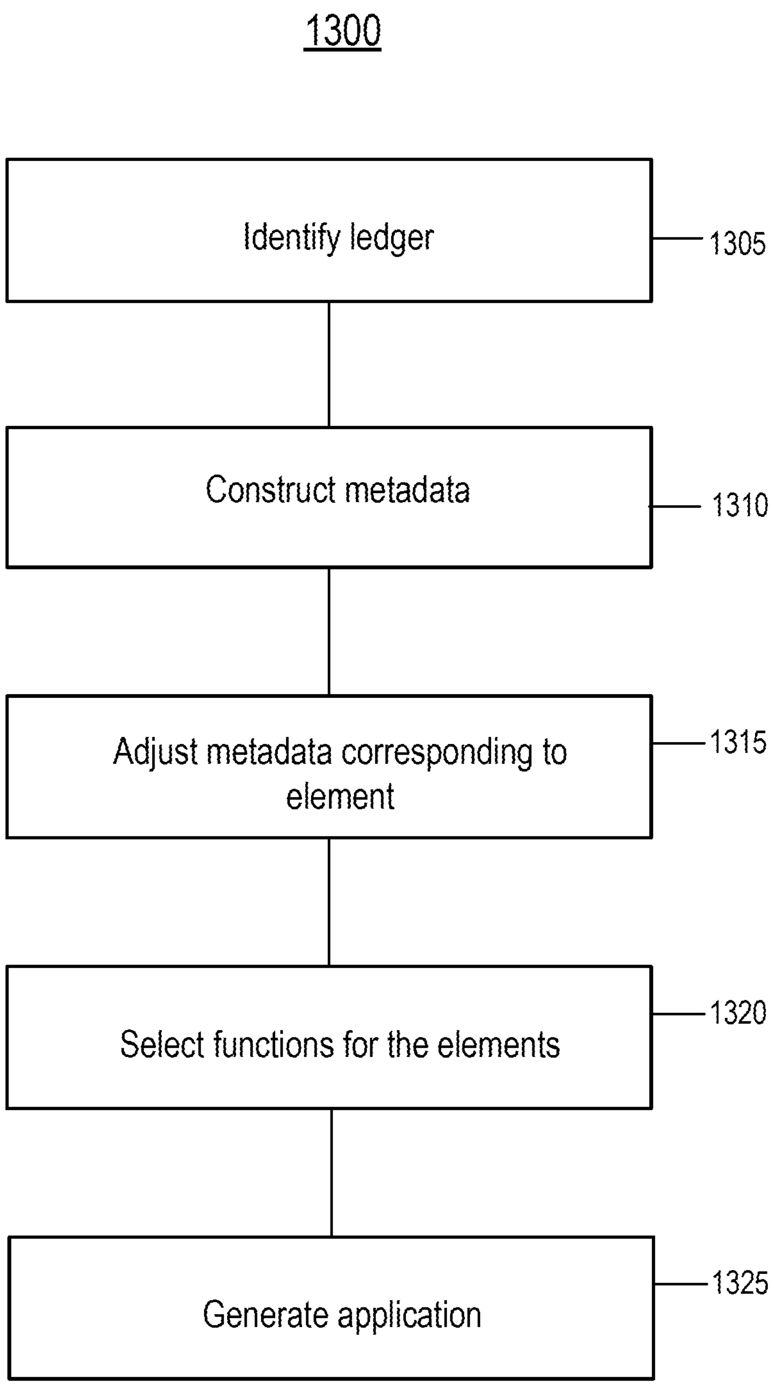
FIG. 13 shows another example process flow of method for streamlined generation of applications customized using user-specified configurations implemented in a ledger (e.g., a spreadsheet).

FIG. 13 shows another example process flow of a method 1300 for automated generation of applications customized using user-specified configurations implemented in a ledger. Method 1300 can be implemented using the system tools, devices and components discussed herein (e.g., system examples 100-500) discussed, for example in connection with FIGS. 1-12. Method 1300 can include acts 1305-1325. At act 1305, a ledger can be identified. At act 1310, a metadata can be constructed. At act 1315, metadata can be adjusted corresponding to an element. At act 1320, functions for the elements can be selected. At act 1325, application can be generated.

At act 1305, a ledger, such as a spreadsheet, can be identified. For example, a data processing system can detect, identify, select, receive or read a ledger (e.g., spreadsheet) configured by a user. The method can include one or more processors coupled with memory identifying a ledger (e.g., spreadsheet). The ledger can include a plurality of parameters for a plurality of elements. The plurality of elements can be elements of a user interface to control an application, or any other element of an application, such as a web-based application, a mobile application, a customized system application or any other application executed on a computing device.

The plurality of elements can include any one or more of (e.g., combination of) features or functions of an application. For example, an element can include an input from a second ledger corresponding to a second application, a recommendation to a third ledger corresponding to a third application, or a visual component to display via a user interface of the application. An element of an application can include a hierarchical organization of portions of the application, such as a menu or a button on a user interface, one or more (e.g., a chain of) prompts or questions for the user, a group of options for the user to choose from, or any other configuration for the application. An element can include a field for input or selection by a user, a selection for a drop down menu or a content provided based at least on a prior user selection. An element can include a validation feature, such as a constraint, range or limitations for inputs by users. An element can include an authorization feature, such as a feature or a function for authorizing or not authorizing access to an element of an application.

The one or more processors can receive the ledger from a user device. The ledger can include a spreadsheet having one or more (e.g., a plurality of) worksheets. Each worksheet can correspond to a respective element of the plurality of elements and a respective parameter selected by a user of the ledger to configure the respective element. Ledger (e.g., spreadsheet) can include fields and parameters indicative of any element of the plurality of elements. For example, one or more fields can include one or more user-provided or user selected parameters adjusting, controlling, setting, activating, deactivating or otherwise configuring an element. Parameters and fields can indicate an element. Parameters and fields can indicate settings, adjustments, or configurations to any element of the plurality of elements.

At act 1310, a metadata can be constructed. The method can include the one or more processors constructing, generating or producing, via a metadata conversion protocol, a plurality of metadata. The plurality of metadata can correspond to the plurality of elements. The one or more processors can construct, generate or produce the plurality of metadata based at least on, using, or according to the plurality of parameters. The metadata conversion protocol can include generating an intermediary data structure from the portions of the ledger (e.g., fields and parameters configuring elements), and then generating metadata data structures, from the intermediary data structures, to conform to the model of the metadata for generating the application.

The one or more processors can generate, produce or construct an intermediary data structure. The intermediary data structure can be generated, constructed or produced based at least on a field of the ledger corresponding to an element of the plurality of elements. For example, a metadata creator can utilize a parser to parse user-configured spreadsheet. The parser can identify portions of the spreadsheet corresponding to any elements configured by the user using fields and/or parameters. The metadata creator can generate, produce or construct an intermediary data structure based on the parsed and identified sections of the spreadsheet corresponding to an element of the application.

The one or more processors can convert, the intermediary data structure into a metadata data structure in accordance with a metadata conversion protocol (e.g., format of a model for metadata). The metadata conversion protocol can include, for example, a process of conversion of data from the user-defined spreadsheet inputs (e.g., parameters and fields of the spreadsheet) to metadata data structures formatted and structured in accordance with the metadata model. The one or more processors can generate, provide or maintain a model for the metadata. The model can define or provide format or parameters for the metadata. The metadata creator and/or application creator can convert the intermediary data structure into a metadata data structure in conformance with the model.

The one or more processors can identify, from the ledger, a field corresponding to an adaptive content element. The adaptive content element can modify a second prompt to a user of the application based at least on a response of the user to a first prompt of the application preceding the second prompt. The one or more processors can identify, from the ledger, an authorization feature corresponding to the element. The one or more processors can identify, from the ledger, a field corresponding to a user-configured prompt for a user of an application, a user-configured drop-down menu or a selection button. The one or more processors can identify, from the ledger, a parameter for an element (e.g., second element) of the plurality of elements indicating a language for the application. The one or more processors can parse the plurality of elements from the ledger to generate the plurality of metadata in accordance with one of a format, a structure or an attribute of a model.

The one or more processors can store the plurality of metadata in a database. Each of the plurality of metadata can correspond to each of the plurality of elements. For example, metadata creator can store one or more intermediary data structures and/or metadata data structures into the metadata storage.

At act 1315, metadata can be adjusted corresponding to an element. The method can include the one or more processors modifying, adjusting or reconfiguring, based on a validation rule corresponding to an element of the plurality of elements, a metadata of the plurality of metadata corresponding to the element. For example, metadata creator and/or application creator can determine that an intermediary data structure or a metadata data structure does not conform to a validation rule. For example, an element configuration can exceed constraints for the configuration, such as the number of characters to include, a type of input to provide or a selection to make. In response to the constraints being exceeded, the one or more processors can modify, adjust or reconfigure the metadata (e.g., metadata data structure or intermediary data structure) to conform to the metadata model.

The one or more processors can determine, responsive to the authorization feature, that access to the element is restricted. For example, a configuration for an element can include an authorization feature to restrict a particular class or type of users or provide a read-only or configurable prompts based on the authorization. Responsive to the determination, the metadata creator can modify the element or feature to make it restrictive based on the authorization.

At act 1320, functions for the elements can be selected. The method can include the one or more processors selecting a plurality of functions corresponding to the plurality of elements. For example, the one or more processors can select a conversion function to convert a particular portion of data from the ledger into a particular metadata for a particular element of the application. The one or more processors can configure the plurality of elements based at least on the plurality of parameters (e.g., values) for the fields corresponding to the element. The one or more processors can select an element function to use a metadata data structure to generate an element of the application in accordance with the configuration described or indicated in the metadata data structure.

For example, the one or more processors can select a language function to generate the plurality of elements in accordance with a language configured or selected by a user in one or more fields of the ledger. For example, the one or more processors can select a validator function to validate user configurations, selections or settings in accordance with constraints, range or limitations. The constraints, range or limitations can be provided by validation rules configured or selected by a user in one or more fields of the ledger. For example, the one or more processors can select an adaptive content function to generate a plurality of prompts or windows where the content of a second or subsequent window or prompt depends on the selection of the user in response to a prior prompt or window, as configured or selected by a user in one or more fields of the ledger. For example, the one or more processors can select a user interface menu function to generate a user interface menu with selections, choices or features configured or selected by a user in one or more fields of the spreadsheet. For example, the one or more processors can select a recommender function to recommend to the user features or elements configured or selected by a user in one or more fields of another spreadsheet that is different from the spreadsheet for configuring the present application being generated.

At act 1325, application can be generated. The method can include the one or more processors generating, using the plurality of functions, a version of the application configured with the user interface comprising the plurality of elements. The version of the application can be generated based at least on the plurality of metadata comprising the adjusted metadata. For example, the one or more processors can generate the application using the metadata data structure, which can be generated or produced based on the intermediary data structure parsed from the ledger template.

The one or more processors can generate the plurality of metadata according to a format of a model for metadata and based at least on the configured plurality of fields. The fields from the ledger can be conformed to the model for metadata (e.g., metadata conversion protocol) by formatting the user-configured data or inputs into the format of the model for metadata.

The one or more processors can generate the application having any user-configured elements. For example, the one or more processors can generate the application having the access to the element restricted in response to a determination that access to the element is restricted (e.g., per authorization feature). For instance, the one or more processors can generate the application comprising the first prompt and the second prompt and the adaptive content element. For instance, the one or more processors can generate the application comprising the user-configured prompt window, drop-down menu, radio button, selection field, search field, user selection, user-provided content for display or any other feature or element discussed herein. The one or more processors can generate the application according to the model for metadata. The one or more processors can generate the application having content of the plurality of elements provided in the language indicated by the parameter for the second element.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

The systems described above can provide multiple ones of any or each of those components and these components can be provided on either a standalone system or on multiple instantiations in a distributed system. Example and non-limiting module implementation elements can include components, such as detectors or sensors providing or using any value determined herein or sensors providing any value that is a precursor to a value determined herein. Implementation elements can also include a datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

While operations are depicted in the drawings in a particular order, such operations are not required to be performed in the particular order shown or in sequential order, and all illustrated operations are not required to be performed. Actions described herein can be performed in a different order and functions from one illustrated block can be called by other functions in other blocks. Also, although many of the examples presented herein involve specific combinations of method acts or system elements, those acts, and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements. Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system comprising:

one or more processors coupled with memory to:

receive a selection of a ledger comprising a plurality of parameters for a plurality of elements of an application;

construct, by converting a parameter of the plurality of parameters from the ledger according to a metadata conversion protocol that converts the parameter into a metadata data structure for an element of the plurality of elements, the metadata data structure conforming to a metadata model and being one of a plurality of metadata corresponding to the plurality of elements;

adjust, based on a validation rule applied to the element of the plurality of elements, the metadata data structure corresponding to the element;

select, based at least on the plurality of elements, a plurality of functions for the plurality of metadata; and generate, using the plurality of functions, an instance of the application comprising the plurality of elements based at least on the adjusted metadata data structure.

2. The system of claim 1, comprising the one or more processors to:

receive the ledger from a user device;

configure the plurality of elements based at least on the plurality of parameters; and generate the plurality of metadata according to a format of the metadata model for metadata and based at least on the configured plurality of elements.

3. The system of claim 1, wherein the ledger includes a spreadsheet having a plurality of worksheets, each of the worksheets corresponding to a respective element of the plurality of elements and a respective parameter selected by a user of the spreadsheet to configure the respective element.

4. The system of claim 1, wherein the plurality of elements includes at least one of:

input from a second ledger corresponding to a second application, a recommendation to a third ledger corresponding to a third application, a visual component to display via a user interface of the application, a hierarchical organization of portions of the application, a field for input or selection by a user, a selection for a drop down menu and a content provided based at least on a prior user selection.

5. The system of claim 1, comprising the one or more processors to:

identify, from the ledger, an authorization feature corresponding to the element;

determine, responsive to the authorization feature, that access to the element is restricted; and generate, responsive to the determination, the application having the access to the element restricted.

6. The system of claim 1, comprising the one or more processors to:

identify, from the ledger, a field corresponding to an adaptive content element to modify a second prompt to a user of the application based at least on a response of the user to a first prompt of the application preceding the second prompt; and generate the application comprising the first prompt and the second prompt and the adaptive content element.

7. The system of claim 1, comprising the one or more processors to:

parse the plurality of elements from the ledger to generate the plurality of metadata in accordance with one of a format, a structure or an attribute of the metadata model;

store the plurality of metadata in a database, each of the plurality of metadata corresponding to each of the plurality of elements; and generate the application according to the metadata model.

8. The system of claim 1, comprising the one or more processors to:

identify, from the ledger, a parameter for a second element of the plurality of elements indicating a language for the application; and generate the application having content of the plurality of elements provided in the language indicated by the parameter for the second element.

9. The system of claim 1, comprising the one or more processors to:

generate, based at least on a field of the ledger corresponding to the element of the plurality of elements, an intermediary data structure;

convert the intermediary data structure into the metadata data structure in accordance with a format of the metadata model; and generate the application using the metadata data structure.

10. A computer-implemented method comprising:

constructing, by one or more processors coupled with memory, a metadata data structure corresponding to an element of a plurality of elements of an application by converting a parameter from a ledger according to a metadata conversion protocol that converts the parameter into the metadata data structure for the element of a plurality of elements, the metadata data structure conforming to a metadata model and being one of a plurality of metadata corresponding to the plurality of elements;

adjusting, by the one or more processors, based on a validation rule corresponding to the element, the metadata data structure corresponding to the element;

selecting, by the one or more processors based at least on the element, a function for the metadata; and generating, by the one or more processors, using the function, an instance of the application comprising the element based at least on the adjusted metadata data structure.

11. The method of claim 10, comprising:

receiving, by the one or more processors, the ledger or an identification of the ledger from a user device;

configuring, by the one or more processors, the element based at least on the parameter; and generating, by the one or more processors, the metadata according to a format of the metadata model for metadata and based at least on a field of the ledger.

12. The method of claim 10, wherein the ledger includes a spreadsheet comprising a worksheet associated with the element, the worksheet specifying the parameter to configure the element.

13. The method of claim 10, wherein the element is one from a group of elements comprising:

input from a second ledger corresponding to a second application, a recommendation to a third ledger corresponding to a third application, a visual component to display via a user interface of the application, a hierarchical organization of portions of the application, a field for input or selection by a user, a selection for a drop down menu and a content provided based at least on a prior user selection.

14. The method of claim 10, comprising:

identifying, by the one or more processors, from the ledger, an authorization feature corresponding to the element;

determining, by the one or more processors, responsive to the authorization feature, that access to the element is restricted; and generating, by the one or more processors, responsive to the determination, the application with restricted access to the element.

15. The method of claim 10, comprising:

identifying, by the one or more processors, from the ledger, a field corresponding to an adaptive content element to modify a second prompt based at least on a response to a first prompt of the application, the first prompt preceding the second prompt; and generating, by the one or more processors, the application comprising the first prompt, the second prompt, and the adaptive content element.

16. The method of claim 10, comprising:

parsing, by the one or more processors, the element from the ledger to generate the metadata data structure in accordance with one of a format, a structure, or an attribute of the metadata model;

storing, by the one or more processors, the metadata in a database, the metadata corresponding to the element; and generating, by the one or more processors, the application according to the metadata model.

17. The method of claim 10, comprising:

identifying, by the one or more processors, from the ledger, a parameter for a second element of a plurality of elements indicating a language for the application; and generating, by the one or more processors, the application having content of the plurality of elements provided in the language indicated by the parameter for the second element.

18. The method of claim 10, comprising:

generating, by the one or more processors, based at least on a field of the ledger corresponding to the element of the plurality of elements, an intermediary data structure;

converting, by the one or more processors, the intermediary data structure into the metadata data structure in accordance with a format of the metadata model; and generating, by the one or more processors, the application using the metadata data structure.

19. A non-transitory computer-readable medium storing instructions which, when executed by at least one processor, cause the at least one processor to:

construct a metadata data structure corresponding to an element of a plurality of elements of a first application by converting one or more parameters specified in a first ledger according to a metadata conversion protocol that converts a parameter of the one or more parameters into the metadata data structure for the element of a plurality of elements, the metadata data structure conforming to a metadata model and being one of a plurality of metadata corresponding to the plurality of elements;

adjust, based on a validation rule corresponding to the element, the metadata data structure corresponding to the element;

select, based at least on the element, a function for the metadata; and generate, using the function, an instance of the application comprising the element based at least on the adjusted metadata data structure.

20. The non-transitory computer-readable medium of claim 19, wherein the instructions, when executed by the one or more processors, cause the one or more processors to:

receive the ledger or an identification of the ledger from a user device;

configure the element based at least on the parameter; and generate metadata according to a format of the metadata model for metadata and based at least on a field of the ledger.

* * * * *